United States Patent
Sun et al.

(10) Patent No.: US 9,236,952 B2
(45) Date of Patent: Jan. 12, 2016

(54) DETECTING AND CORRECTING CYCLE SLIPS TO MINIMIZE SYSTEM PENALTY

(71) Applicant: Infinera Corp., Sunnyvale, CA (US)

(72) Inventors: Han H. Sun, Ottawa (CA); John D. McNicol, Ottawa (CA); Kuang-Tsan Wu, Ottawa (CA)

(73) Assignee: Infinera Corporation, Sunnyvale, CA (US)

(*) Notice: Subject to any disclaimer, the term of this patent is extended or adjusted under 35 U.S.C. 154(b) by 189 days.

(21) Appl. No.: 14/140,773

(22) Filed: Dec. 26, 2013

(65) Prior Publication Data
US 2015/0188642 A1    Jul. 2, 2015

(51) Int. Cl.
*H04B 10/06* (2006.01)
*H04B 10/61* (2013.01)
*H04J 14/02* (2006.01)

(52) U.S. Cl.
CPC ............ *H04B 10/6165* (2013.01); *H04J 14/02* (2013.01)

(58) Field of Classification Search
CPC ........... H04B 10/6165; H04B 10/0779; H04B 10/61; H04B 10/616; H04B 2210/074; H04L 7/0075; H04J 14/02
USPC .......... 398/202–205, 208, 210, 25, 32, 30, 33
See application file for complete search history.

(56) References Cited

U.S. PATENT DOCUMENTS

| | | | | |
|---|---|---|---|---|
| 5,790,613 A * | 8/1998 | Tateishi | ................... | H04L 7/033 375/317 |
| 7,409,024 B2 * | 8/2008 | Ginesi | ................. | H04L 27/0014 375/362 |
| 7,522,841 B2 * | 4/2009 | Bontu | ................... | H04J 3/0608 398/152 |
| 7,606,498 B1 * | 10/2009 | Wu | ........................ | H04B 10/60 398/152 |
| 7,962,048 B2 * | 6/2011 | Taylor | .................... | H04B 10/60 398/202 |
| 8,166,365 B2 * | 4/2012 | Harley | ................. | H03M 13/333 714/752 |
| 8,588,624 B2 * | 11/2013 | Zhang | ................. | H04B 10/0779 398/208 |
| 8,849,125 B2 * | 9/2014 | Sun | ......................... | H04J 14/06 398/140 |
| 8,861,636 B2 * | 10/2014 | Sun | ..................... | H04B 10/6165 398/152 |
| 8,924,823 B2 * | 12/2014 | Zhang | ..................... | G06F 11/10 714/776 |
| 2007/0092260 A1 * | 4/2007 | Bontu | ................... | H04J 3/0608 398/152 |
| 2013/0022147 A1 | 1/2013 | Sun et al. | | |

(Continued)

OTHER PUBLICATIONS

Gao et al., "Blind Cycle-Slip Detection and Correction for Coherent Communication Systems", 39th European Conference and Exhibition on Optical Communication, Sep. 22-26, 2013, 3 pages.

(Continued)

*Primary Examiner* — Hibret Woldekidan
(74) *Attorney, Agent, or Firm* — Harrity & Harrity LLP; David L. Soltz

(57) ABSTRACT

An optical receiver receives an optical signal with a phase error and pilot symbols, and converts the optical signal into an electrical signal. The optical receiver identifies, based on the pilot symbols, a cycle slip due to the phase error and associated with a transition time. The optical receiver determines, based on the pilot symbols, a direction and a center of the cycle slip, and generates a rotation value based on the direction and the center. The optical receiver applies the rotation value to minimize the phase error in the electrical signal except for phase error associated with the transition time and to generate a modified electrical signal. The optical receiver generates an erase signal based on the transition time and the center of the cycle slip, and uses the erase signal to minimize an effect of the phase error associated with the transition time of the cycle slip.

20 Claims, 21 Drawing Sheets

(56) References Cited

U.S. PATENT DOCUMENTS

| | | | |
|---|---|---|---|
| 2013/0209089 A1* | 8/2013 | Harley | H04B 10/5561 398/25 |
| 2014/0010532 A1* | 1/2014 | Zhang | H04B 10/0779 398/25 |
| 2015/0071312 A1* | 3/2015 | Batshon | H04B 10/2575 370/542 |
| 2015/0160497 A1* | 6/2015 | Sonoda | G02F 1/13394 349/153 |
| 2015/0215050 A1* | 7/2015 | Liu | H04B 10/6165 398/208 |

OTHER PUBLICATIONS

Co-pending U.S. Appl. No. 13/630,630, entitled "Channel Carrying Multiple Digital Subcarriers", by Krause et al., filed Sep. 28, 2012, 57 pages.

* cited by examiner

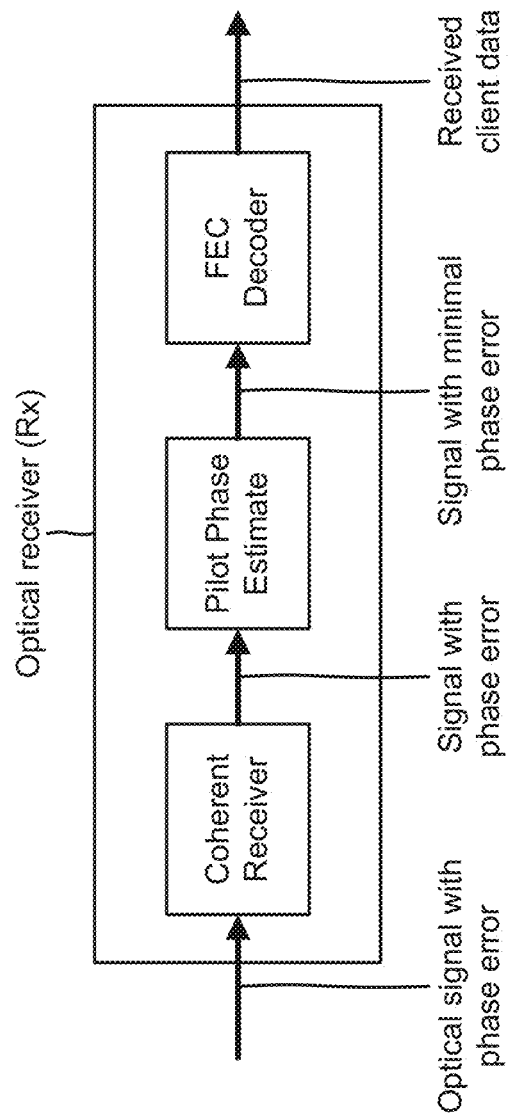

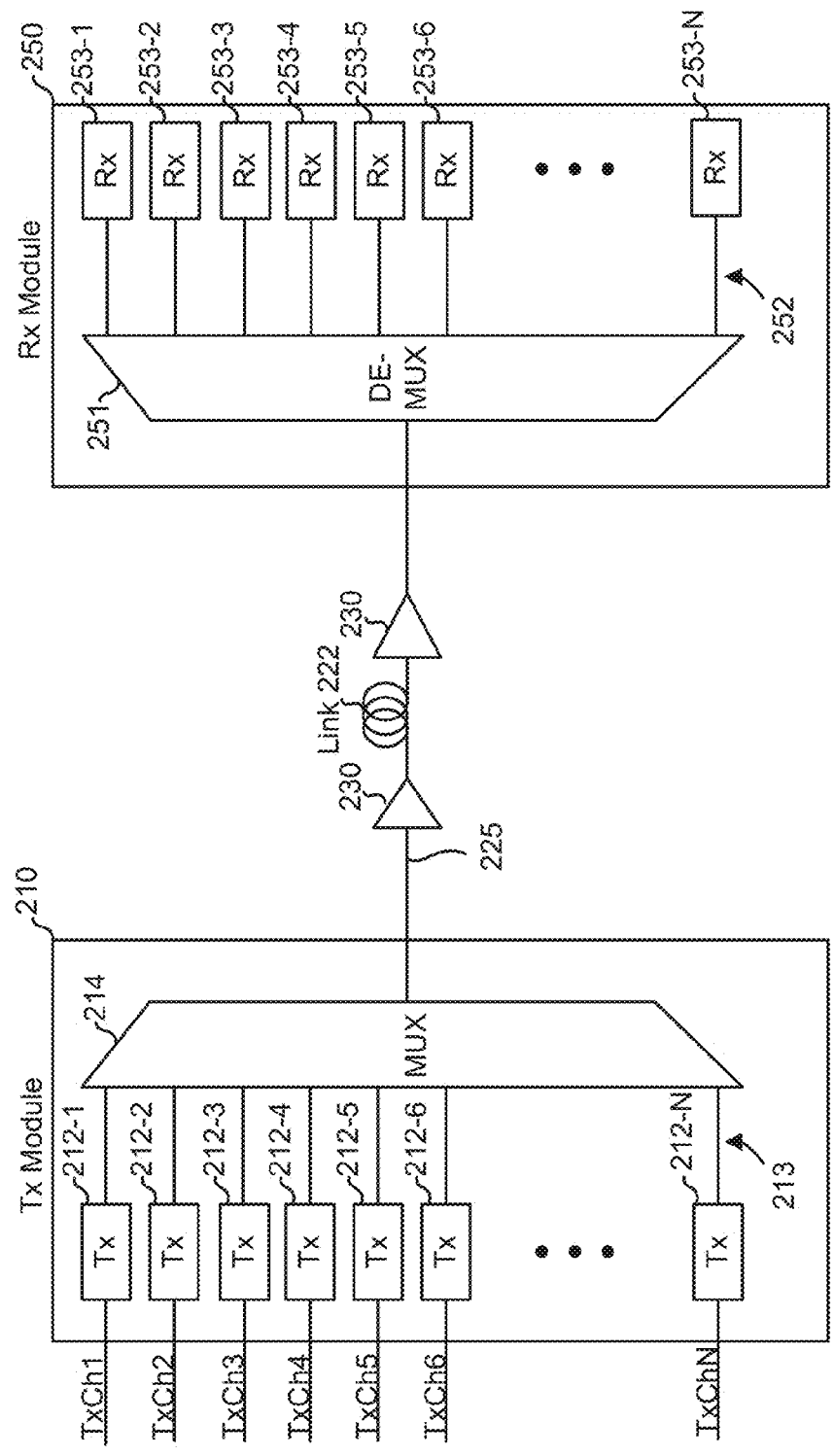

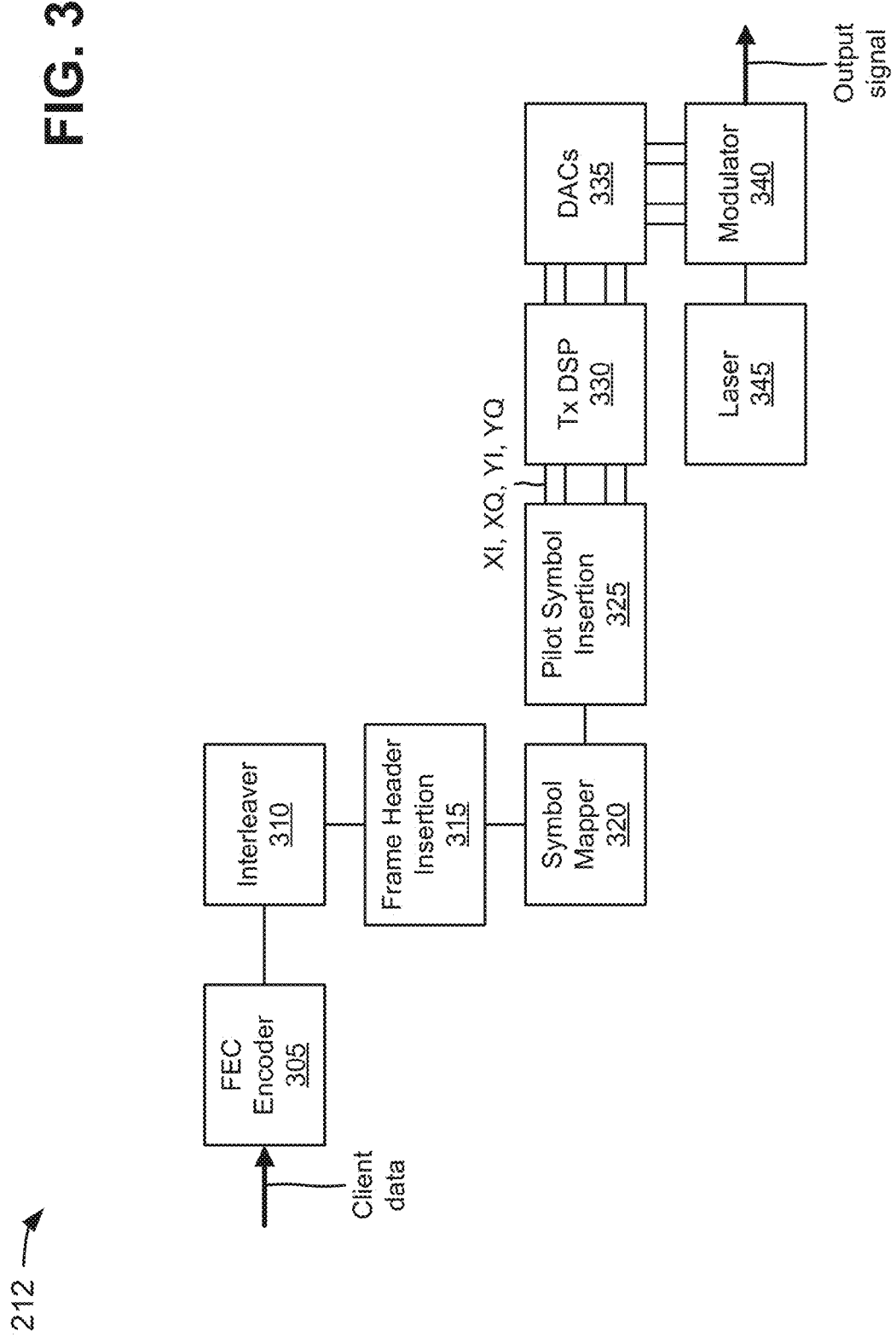

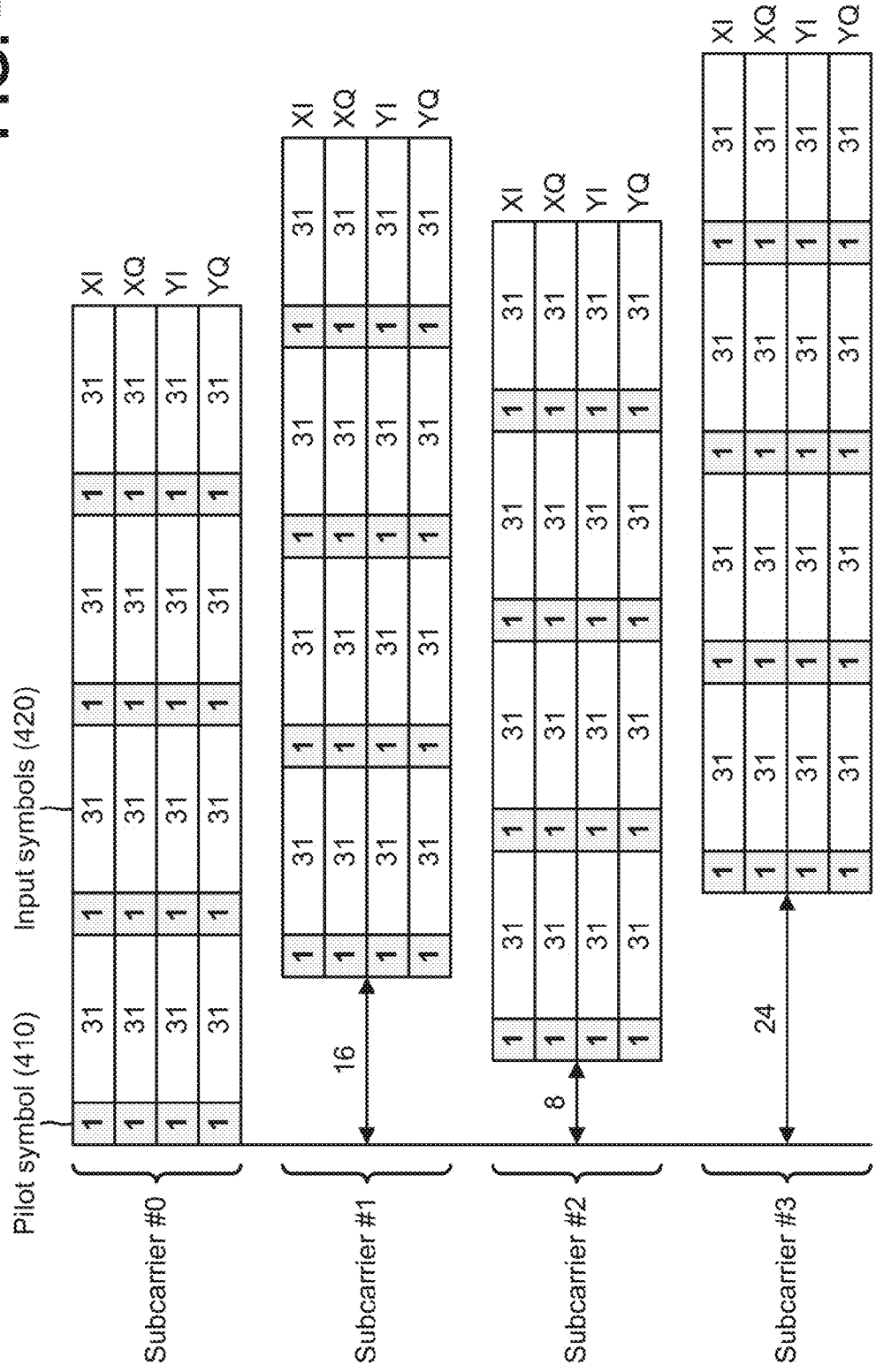

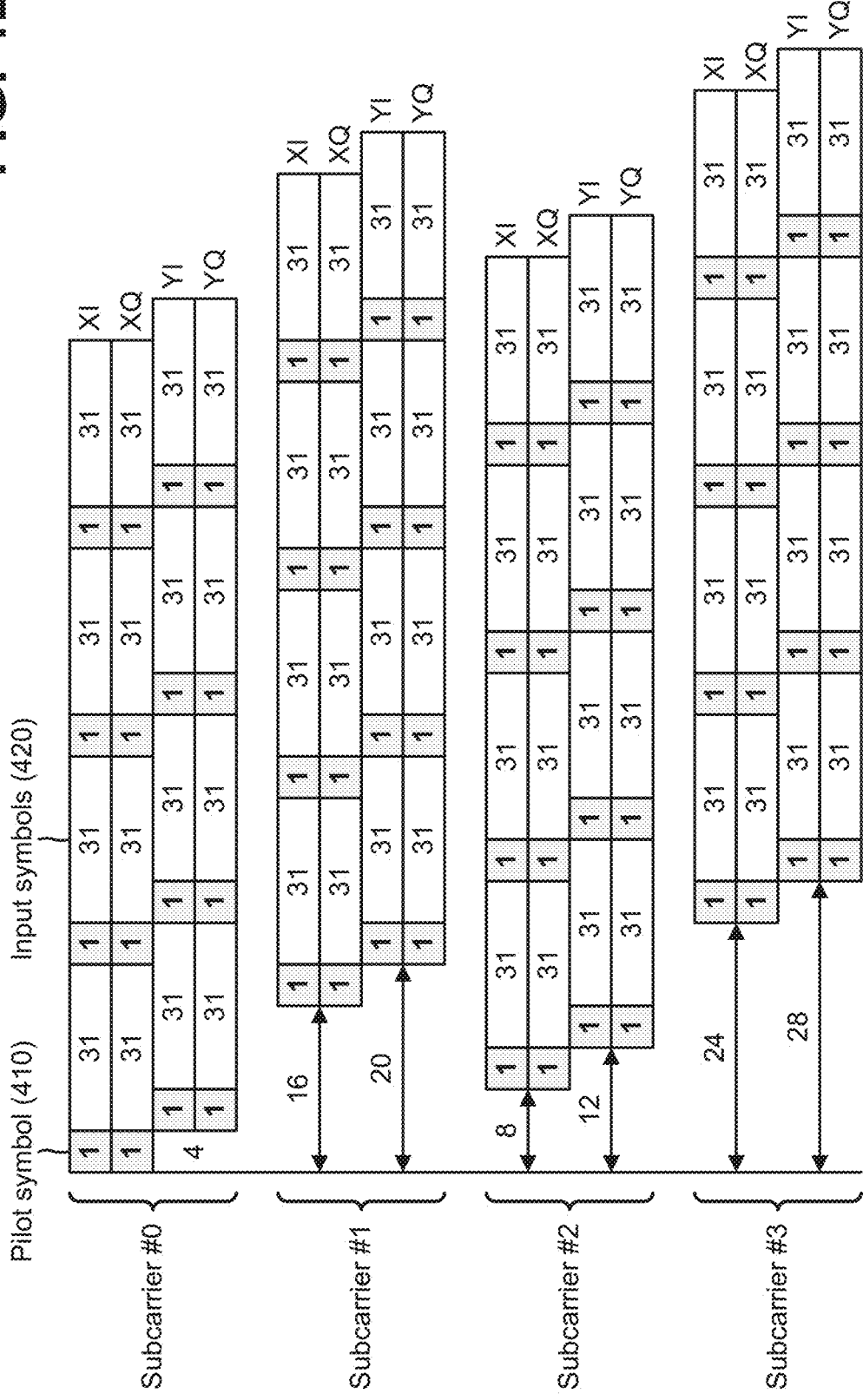

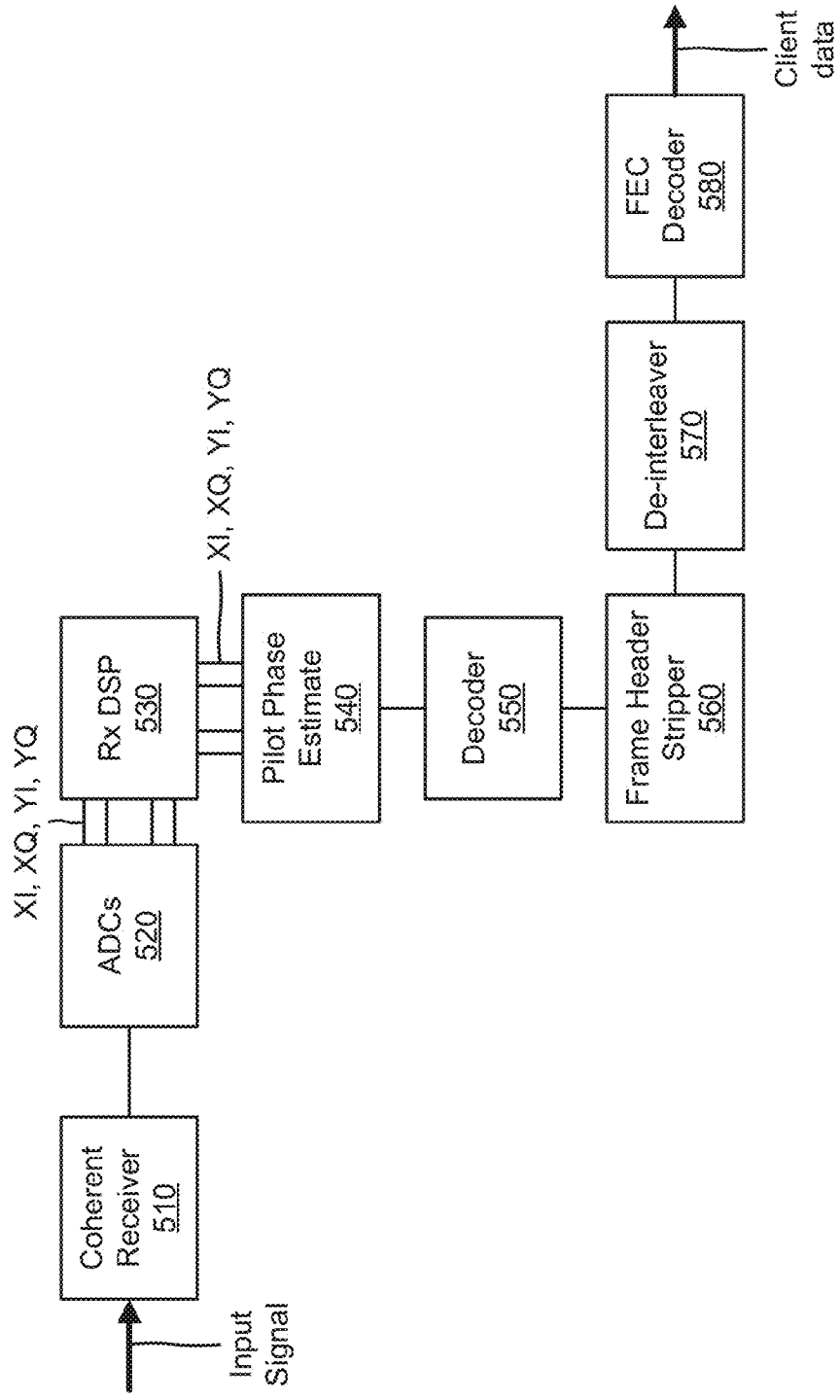

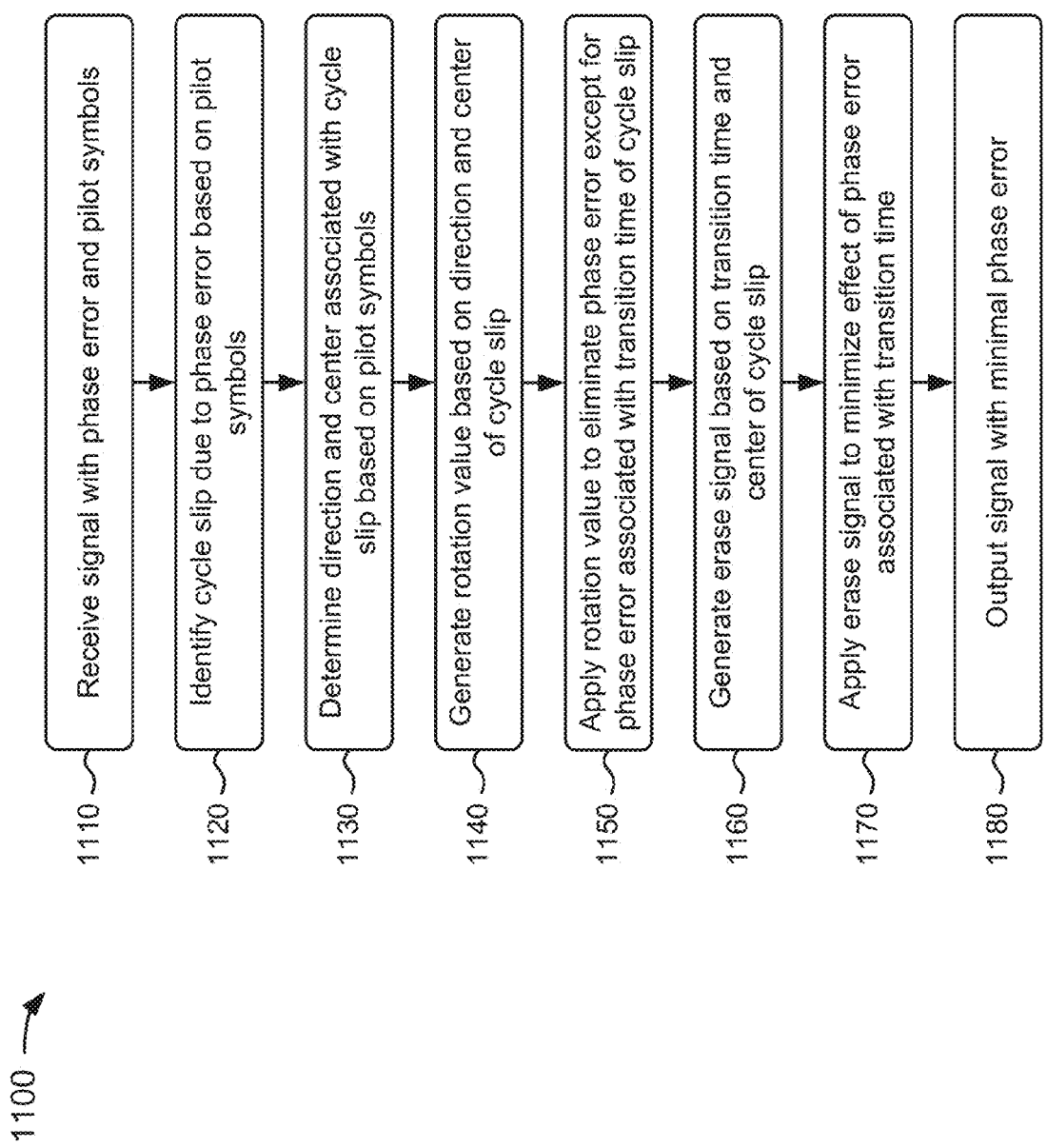

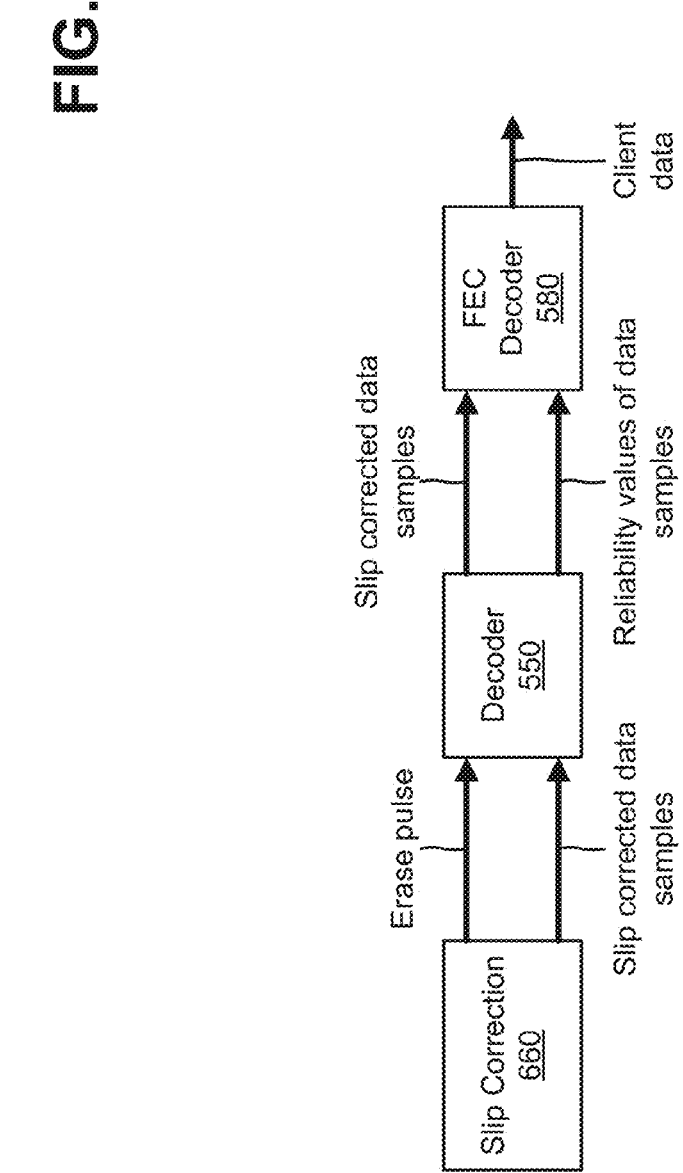

DETECTING AND CORRECTING CYCLE SLIPS TO MINIMIZE SYSTEM PENALTY

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include an optical transmitter (Tx), such as a laser associated with each wavelength, a modulator configured to modulate the output of the laser, and a multiplexer to combine each of the modulated outputs (e.g., to form a combined output or WDM signal). Dual-polarization (DP) (also known as polarization multiplex (PM)) is sometimes used in coherent optical modems. An optical transmitter may be associated with a polarization beam combiner (PBC) that combines two optical signals into a composite DP signal.

A WDM system may also include an optical receiver (Rx). The optical receiver may be associated with a polarization beam splitter (PBS) that receives an optical signal (e.g., a WDM signal), splits the received optical signal, and provides two optical signals (e.g., associated with orthogonal polarizations) associated with the received optical signal. The optical receiver may also be associated with an optical demultiplexer circuit (referred to as a "demultiplexer") configured to receive the optical signals provided by the PBS and demultiplex each one of the optical signals into individual optical signals. Additionally, the optical receiver may include receiver components to convert the individual optical signals into electrical signals, and output the data carried by those electrical signals.

The optical transmitter (Tx) and the optical receiver (Rx), in an optical communication system, may support communications over a number of wavelength channels. For example, a pair of optical transmitter/receiver may support ten channels, each spaced by, for example, 200 GHz. The set of channels supported by the optical transmitter and the optical receiver can be referred to as a channel grid. Channel grids for the optical transmitter and the optical receiver may be aligned to standardized frequencies, such as those published by the Telecommunication Standardization Sector (ITU-T). The set of channels supported by the optical transmitter and the optical receiver may be referred to as an ITU frequency grid.

In a WDM system, each wave (e.g., signal) of the optical transmitter may modulate the phase and/or amplitude of a laser in order to convey data (via the signal) to the optical receiver where the signal may be demodulated such that data, included in the signal, may be recovered. A particular modulation format (e.g., quadrature phase-shift keying (QPSK), quadrature amplitude modulation (QAM), binary phase-shift keying (BPSK), or the like) may be used to modulate the input signal. The signal may be subject to phase noise during transmission. The different modulation formats and/or the noise may result in a tradeoff between capacity and reach.

The optical receiver may include a digital signal processor (DSP) that tracks a phase of a modulated signal by applying a carrier phase recovery function. Phase tracking may permit the optical receiver to compensate for random phase fluctuations, associated with lasers of the optical transmitter and/or the optical receiver, so that the optical receiver may properly decode transmitted bits in the signal. However, phase tracking, when subjected to a large amount of noise, may momentarily lose lock and cause a cycle slip. A cycle slip may occur when the phase of the signal locks at a first phase (e.g., zero (0) degrees), and then transitions to and re-locks at a second phase (e.g., ninety (90) degrees). The QPSK constellation may include ninety degrees of symmetry that is invariant over ninety degree rotations and is a valid lock point. A transition time from zero to ninety degrees may generally be on an order of a time constant of a phase estimation process.

A ninety degree phase ambiguity can be resolved by differential encoding in the optical transmitter and differential decoding in the optical receiver. However, such an approach doubles an error rate at the optical receiver, which causes the overall optical system to tolerate less noise at the optical receiver. Another approach inserts two consecutive pilot symbols, for every sixty-four (64) information-carrying symbols, in a signal generated by the optical transmitter. The two pilot symbols may be used by the optical receiver for detecting ninety degree phase ambiguity and for rotating the information-carrying symbols based on a phase detected with the two pilot symbols. However, such an approach determines a location of cycle slips with an uncertainty of +/−thirty-three (33) symbols. This uncertainty results in a considerable number of decoded bits with an inverted sign. At high cycle slip rates, such as $10^{-4}$ (e.g., a cycle slip every $10^4$ symbols), the rate of sign inversions may approach $10^{-3}$. Such a high rate of sign inversions can significantly degrade a performance of a forward error correction (FEC) decoder in the optical receiver.

SUMMARY

In some implementations, an optical system may include an optical receiver configured to receive a signal with a phase error and pilot symbols, and identify, based on the pilot symbols, a cycle slip due to the phase error and associated with a transition time. The optical receiver may be further configured to determine, based on the pilot symbols, a direction and a center of the cycle slip, generate a rotation value based on the direction and the center of the cycle slip, an apply the rotation value to minimize the phase error in the signal except for phase error associated with the transition time of the cycle slip and to generate a modified signal. The optical receiver may be further configured to generate an erase signal based on the transition time and the center of the cycle slip, and use the erase signal to minimize an effect of the phase error associated with the transition time of the cycle slip.

In some implementations, an optical receiver may include a first component configured to receive an optical signal with a phase error and pilot symbols, and convert the optical signal into an electrical signal with the phase error and the pilot symbols. The optical receiver may include a second component configured to receive the electrical signal from the first component, and identify, based on the pilot symbols, a cycle slip due to the phase error and that is associated with a transition time. The second component may be configured to determine, based on the pilot symbols, a direction and a center associated with the cycle slip, and generate a rotation value based on the direction and the center of the cycle slip. The second component may be configured to apply the rotation value to minimize the phase error in the electrical signal except for phase error associated with the transition time of the cycle slip and to generate a modified electrical signal. The second component may be configured to generate an erase signal based on the transition time and the center of the cycle slip, and use the erase signal to minimize an effect of the phase error associated with the transition time of the cycle slip.

In some implementations, an optical receiver may include a first component configured to receive an optical signal with a phase error and pilot symbols, and convert the optical signal into an electrical signal with the phase error and the pilot symbols. The optical receiver may include a second component configured to receive the electrical signal from the first component, and generate a phase estimate based on the pilot symbols of the electrical signal. The optical receiver may include a third component configured to receive the phase estimate from the second component, and filter the phase estimate to eliminate noise in the phase estimate. The optical receiver may include a fourth component configured to receive the filtered phase estimate from the third component, and interpolate the filtered phase estimate to generate phase values. The optical receiver may include a fifth component configured to receive the phase values from the fourth component, identify, based on the phase values, a cycle slip due to the phase error and that is associated with a transition time. The fifth component may be configured to determine, based on the phase values, a direction and a center of the cycle slip, and generate a rotation value based on the direction and the center of the cycle slip. The fifth component may be configured to apply the rotation value to minimize the phase error in the electrical signal except for phase error associated with the transition time of the cycle slip and to generate a modified electrical signal, and generate an erase signal based on the transition time and the center of the cycle slip.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 1A and 1B are diagrams of an overview of an example implementation described herein;

FIG. 2 is a diagram of an example environment in which systems and/or methods described herein may be implemented;

FIG. 3 is a diagram of example components of an optical transmitter depicted in FIG. 2;

FIGS. 4A and 4B are diagrams of example pilot symbol insertion formats provided by the optical transmitter of FIG. 2;

FIG. 5 is a diagram of example components of an optical receiver depicted in FIG. 2;

FIG. 11 is a flow chart of an example process for detecting cycle slips and minimizing phase errors associated with cycle slips; and FIGS. 12A-12F are diagrams of an example relating to the example process shown in FIG. 11.

DETAILED DESCRIPTION

The following detailed description refers to the accompanying drawings. The same reference numbers in different drawings may identify the same or similar elements.

Figure 1B:
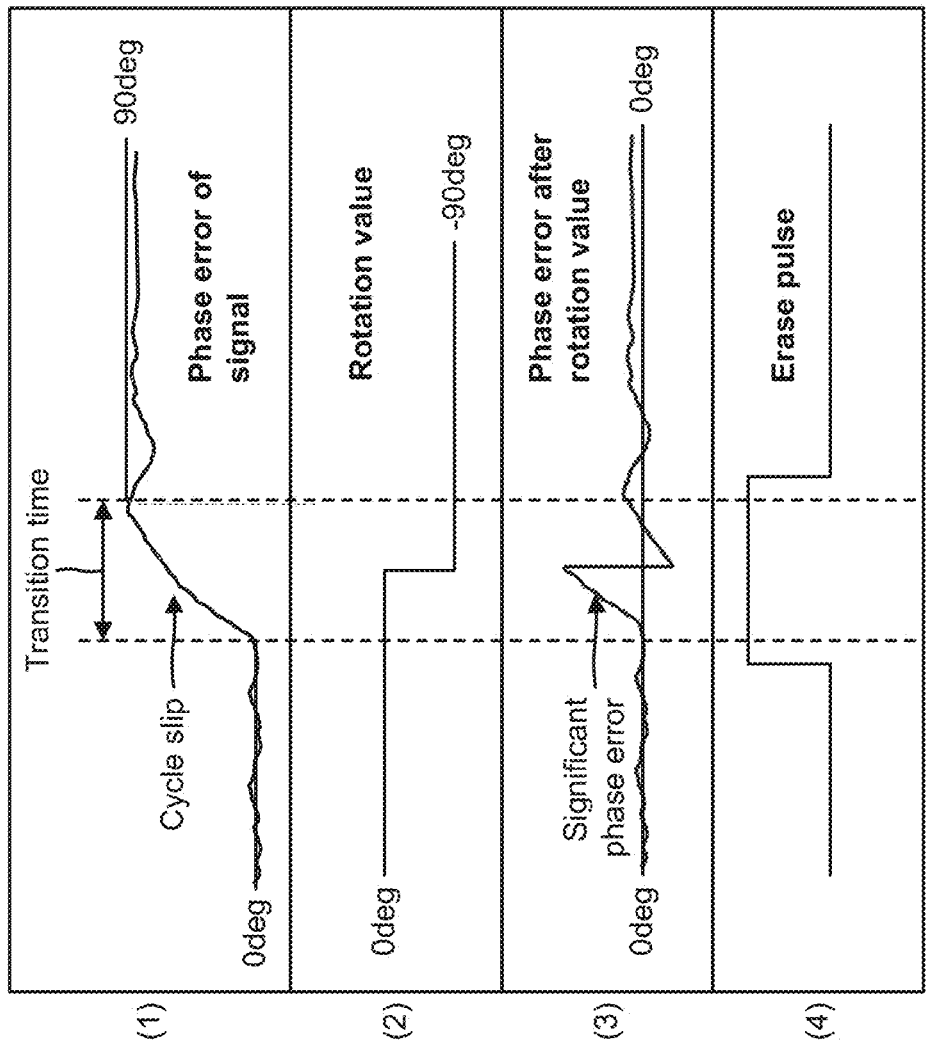

FIGS. 1A and 1B are diagrams of an overview of an example implementation 100 described herein. As shown in FIG. 1A, an optical receiver may include a coherent receiver, a pilot phase estimate component, and a FEC decoder. The coherent receiver may receive an optical signal that includes a phase error due to phase noise encountered by the optical signal during transmission. One or more cycle slips may be associated with the phase error. A first graph of FIG. 1B shows a cycle slip associated with the phase error of the optical signal. The cycle slip occurs when the phase of the optical signal locks at a first phase (e.g., 0 degrees), and then transitions to and re-locks at a second phase (e.g., 90 degrees) over a transition time. In some implementations, the optical signal may include pilot symbols that enable the cycle slip to be detected so that the phase error associated with the cycle slip may be minimized.

As further shown in FIG. 1A, the coherent receiver may convert the optical signal into a signal (e.g., an electrical signal) that provides a representation of the optical signal with the phase error and the pilot symbols. The coherent receiver may provide the signal with the phase error to the pilot phase estimate component. Based on the pilot symbols provided in the signal, the pilot phase estimate component may identify the cycle slip, and may determine a direction, a center, and a transition time associated with the cycle slip. However, due to a non-zero transition time of a cycle slip, symbols after phase rotation may still experience significant phase error. In QPSK modulation, a residual phase error greater than 45 degrees may invert a sign of the data. For example, with reference to the first graph of FIG. 1B, the pilot phase estimate component may identify the cycle slip between the dashed lines, and may determine the center of the cycle slip (e.g., a point halfway between the dashed lines), the direction of the cycle slip (e.g., +90 degrees).

The pilot phase estimate component may generate a rotation value based on the center and the direction of the cycle slip. For example, as shown in a second graph of FIG. 1B, the pilot phase estimate component may generate a rotation value that is at zero degrees until the center of the cycle slip, and then switches to −90 degrees at the center of the cycle slip. The pilot phase estimate component may apply the rotation value to eliminate or minimize the phase error except for the phase error associated with the transition time of the cycle slip. For example, as shown in a third graph of FIG. 1B, the non-zero transition time may cause symbols, both before and after application of the rotation value, to experience significant phase error.

The pilot phase estimate component may generate an erase pulse based on the transition time and the center of the cycle slip. For example, as shown in a fourth graph of FIG. 1B, the erase pulse may be centered on the center of the cycle slip and may encompass the transition time of the cycle slip. The erase pulse may be used in other components (e.g., a soft decision FEC decoder) to zero a reliability value of symbols associated with the cycle slip, which may minimize the performance impact on the FEC decoder.

Systems and/or methods described herein may detect and correct cycle slips in an optical receiver, which may minimize the rate of sign inversions of symbols associated with the transition time of the cycle slip. By minimizing the rate of sign inversions, the systems and/or methods may significantly improve a performance of a FEC decoder in the optical receiver.

Implementations are described herein with respect to an optical signal within one optical channel (or carrier) that includes two or more subcarrier signals (e.g., four subcarrier signals). For example, an optical channel with four eight (8) gigabaud (Gbaud) subcarrier signals may be similar to an optical channel with a single thirty-two (32) Gbaud carrier signal. However, the implementations may be applicable to a single carrier optical signal. In some implementations, a phase error due to the lasers of the optical transmitter and/or the optical receiver and phase noise caused by nonlinear propagation through a fiber link may be substantially the same on each subcarrier signal. In such implementations, a phase estimate from each subcarrier signal may be averaged together. In some implementations, the phase error may be different on each subcarrier signal. In such implementations, a phase estimate from each subcarrier signal may be separate and distinct.

FIG. 2 is a diagram of an example environment 200 in which systems and/or methods described herein may be implemented. As shown in FIG. 2, environment 200 may include a transmitter (Tx) module 210 and/or a receiver (Rx) module 250. In some implementations, transmitter module 210 may be optically connected to receiver module 250 via a link 222, and/or optical amplifiers 230. Link 222 may include one or more optical amplifiers 230 that amplify an optical signal as the optical signal is transmitted over link 222.

Transmitter module 210 may include a number of optical transmitters 212-1 through 212-N (N>1), waveguides 213, and/or an optical multiplexer 214. Each optical transmitter 212 may receive a data channel (TxCh1 through TxChN), modulate the data channel with an optical signal, and transmit the data channel as an optical signal. In some implementations, transmitter module 210 may include 5, 10, 20, 50, 100, or some other number of optical transmitters 212. Each optical transmitter 212 may be tuned to use an optical carrier of a designated wavelength. A grid of wavelengths emitted by optical transmitters 212 may conform to a known standard, such as a standard published by the Telecommunication Standardization Sector (ITU-T).

In some implementations, each of optical transmitters 212 may include a laser, a modulator, a semiconductor optical amplifier (SOA), a digital signal processor (DSP) and/or some other components. The laser, modulator, and/or SOA may be coupled with a tuning element (e.g., a heater) that can be used to tune the wavelength of an optical signal channel output by the laser, modulator, or SOA.

Waveguides 213 may include optical links to transmit modulated outputs (referred to as "signal channels") of optical transmitters 212. In some implementations, each optical transmitter 212 may connect to one waveguide 213 or to multiple waveguides 213 to transmit signal channels of optical transmitters 212 to optical multiplexer 214. In some implementations, waveguides 213 may be made from a birefringent material and/or some other material.

Optical multiplexer 214 may include an arrayed waveguide grating (AWG) or some other multiplexing device. In some implementations, optical multiplexer 214 may combine multiple signal channels, associated with optical transmitters 212, into a wave division multiplexed (WDM) signal, such as an optical signal 225.

As further shown in FIG. 2, receiver module 250 may include an optical demultiplexer 251, waveguides 252, and/or optical receivers 253-1 through 253-O (O>1). In some implementations, optical demultiplexer 251 may include an AWG or some other device. Optical demultiplexer 251 may supply multiple signal channels based on a received WDM signal (e.g., optical signal 225). As shown in FIG. 2, optical demultiplexer 251 may supply signal channels to optical receivers 253 via waveguides 252.

Waveguides 252 may include optical links to transmit outputs of optical demultiplexer 251 to optical receivers 253. In some implementations, each optical receiver 253 may receive outputs via a single waveguide 252 or via multiple waveguides 252. In some implementations, waveguides 252 may be made from a birefringent material and/or some other kind of material.

Each optical receiver 253 may convert an input optical signal to an electrical signal that represents the transmitted data. In some implementations, each optical receiver 253 may include one or more photodetectors and/or related devices to receive respective input optical signals outputted by optical demultiplexer 251 and a local oscillator, convert the signals to a photocurrent, and provide a voltage output to function as an electrical signal representation of the original input signal.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200.

FIG. 3 is a diagram of example components of optical transmitter 212 (FIG. 2). As shown, optical transmitter 212 may include a forward error correction (FEC) encoder 305, an interleaver 310, a frame header insertion component 315, a symbol mapper 320, a pilot symbol insertion component 325, a Tx digital signal processor (DSP) 330, digital-to-analog converters (DACs) 335, a modulator 340, and a laser 345.

FEC encoder 305 may include one or more components that encode bits associated with client data. In some implementations, FEC encoder 305 may include a digital encoding device, or a collection of digital encoding devices. In some implementations, FEC encoder 305 may receive client data, and may encode bits, associated with the client data, to control or reduce errors in the transmission of the bits. In some implementations, FEC encoder 305 may encode the bits using a block code, a convolution code, and/or some other code or technique.

Interleaver 310 may include one or more components that receive bits from FEC encoder 305 and shuffle the bits. Shuffling the bits may prevent multiple bits with errors from being grouped together. In some implementations, interleaver 310 may group the bits into groups (e.g., of four, five, six, etc.), and may provide the grouped bits to frame header insertion component 315.

Frame header insertion component 315 may include one or more components that receive the grouped bits from interleaver 310, and define a frame for the grouped bits. In some implementations, frame header insertion component 315 may insert a frame header for the frame of the grouped bits, and may provide the frame and the frame header to symbol mapper 320. In some implementations, the frame header may be used in optical receiver 253 for frame alignment.

Symbol mapper 320 may include one or more components that receive the frame and the frame header, and map the bits of the frame to modulation symbols (e.g., QPSK symbols, QAM symbols, or symbols of other modulation formats). In some implementations, each modulation symbol may include an in-phase X-polarized (XI) portion, a quadrature X-polarized (XQ) portion, an in-phase Y-polarized (YI) portion, and a quadrature Y-polarized (YQ) portion. In some implementations, symbol mapper 320 may provide the portions of the symbols over lanes associated with the components. For example, symbol mapper 320 may provide XI portions over an XI lane, XQ portions over an XQ lane, YI portions over a YI lane, and YQ portions over a YQ lane. In some implementations, symbol mapper 320 may provide the frame, the frame header, and the mapped modulation symbols to pilot symbol insertion component 325.

Pilot symbol insertion component 325 may include one or more components that receive the frame, the frame header, and the mapped modulation symbols from symbol mapper 320. In some implementations, pilot symbol insertion component 325 may insert one or more pilot symbols into the mapped modulation symbols. In some implementations, the pilot symbols may be used by optical receiver 253 to determine positions of cycle slips. In some implementations, pilot symbol insertion component 325 may insert the pilot symbols according to one of formats 400 depicted in FIGS. 4A and 4B.

As shown in FIGS. 4A and 4B, pilot symbol insertion component 325 may insert one pilot symbol 410 on every thirty-one (31) input data symbols 420 for the XI, XQ, YI, and YQ lanes on all four subcarrier signals. In some implementations, the position of pilot symbols 410 may be offset by a number of symbols in order to evenly spread pilot symbols 410 over a thirty-two (32) symbol time window. For example, as shown in FIG. 4A, pilot symbols 410 may be inserted on symbol index 0, 8, 16 and 24, and then on symbol index 32, 40, 48, and 56, etc. In some implementations, the polarization of pilot symbols 410 may be offset by a number of symbols. For example, as shown in FIG. 4B, pilot symbols 410 may be inserted on symbol index 0, 4, 8, 12, 16, 20, 24, and 28, and then on symbol index 32, 36, 40, 44, 48, 52, 56, and 60, etc. In some implementations, offsetting the position of pilot symbol 410 in each subcarrier signal may permit more accurate detection of the location of a cycle slip.

Returning to FIG. 3, pilot symbol insertion component 325 may provide the frame, the frame header, and the modulation and pilot symbols to Tx DSP 330.

Tx DSP 330 may include one or more components that receive the frame, the frame header, and the modulation and pilot symbols from pilot symbol insertion component 325. In some implementations, Tx DSP 330 may include a digital signal processor or a collection of digital signal processors. In some implementations, Tx DSP 330 may process the frame, the frame header, and the modulation and pilot symbols, and may output the processed information across the XI, XQ, YI, and YQ lanes to DACs 335. For example, Tx DSP 330 may apply spectral shaping to and/or perform filtering on the XI, XQ, YI, and YQ symbols with a desired sampling rate.

Each of DACs 335 may include one or more components that convert a digital signal into an analog signal. In some implementations, DACs 335 may include a signal converting device or a collection of signal converting devices. In some implementations, DACs 335 may receive respective digital signals (e.g., the upsampled and filtered XI, XQ, YI, and YQ symbols) from Tx DSP 330, convert the received digital signals to analog signals, and provide the analog signals to modulator 340. The analog signals may correspond to electrical signals (e.g., voltages) to drive modulator 340.

Modulator 340 may include one or more components that control (e.g., modulate) an intensity, amplitude, and/or phase of an optical signal (e.g., supplied by laser 345) in order to convey data associated with the data source (e.g., via one or more optical carriers of the optical signal). In some implementations, modulator 340 may include an optical modulator, such as an electro-absorption modulator (EAM), a pair of nested Mach-Zehnder modulators (MZMs) for each polarization, or some other type of modulator. In some implementations, modulator 340 may modulate an optical signal from laser 345 based on an input voltage signal provided by DACs 335 to form an output signal. The output signal may be provided to optical receiver 253, and optical receiver 253 may detect the intensity, amplitude, and/or phase of the output signal with a Rx laser signal and subsequent Rx DSP in order to recover client data carried by the output signal.

In some implementations, modulator 340 may be formed as a waveguide with electrodes for applying an electric field, based on the input voltage signal, in a direction perpendicular to the optical signal output by laser 345. In some implementations, modulator 340 may be implemented based on other modulation technologies, such as electro-optic modulation. In some implementations, multiple modulators 340 may be provided to modulate signals associated with particular portions. For example, a first modulator 340 may be provided to modulate an XI portion, a second modulator 340 may be provided to modulate an XQ portion, a third modulator 340 may be provided to modulate a YI portion, and a fourth modulator 340 may be provided to modulate a YQ portion.

Laser 345 may include one or more components that generate and provide an optical signal to modulator 340. In some implementations, laser 345 may include a semiconductor laser, such as a distributed feedback (DFB) laser, or some other type of laser. In some implementations, laser 345 may be an optical source for a single corresponding optical transmitter 212.

The number of components shown in FIG. 3 is provided as an example. In practice, optical transmitter 212 may include additional components, fewer components, different components, or differently arranged components than those shown in FIG. 3. Additionally, or alternatively, one or more components of optical transmitter 212 may perform one or more functions described as being performed by another one or more components of optical transmitter 212.

FIG. 5 is a diagram of example components of optical receiver 253 (FIG. 2). As shown, optical receiver 253 may include a coherent receiver 510, analog-to-digital converters (ADCs) 520, an Rx digital signal processor (DSP) 530, a pilot phase estimate component 540, a decoder 550, a frame header stripper 560, a de-interleaver 570, and a FEC decoder 580.

Coherent receiver 510 may include one or more components that receive an input optical signal and convert the input signal into a corresponding electrical signal. In some implementations, the input signal may correspond to the output signal provided by modulator 340 of optical transmitter 212. In some implementations, coherent receiver 510 may receive the output signal provided by modulator 340 and passed through a fiber link, and may convert the output signal to corresponding voltage signals. In some implementations, coherent receiver 510 may include multiple detectors (e.g., photodetectors) for receiving and converting XI portions, XQ portions, YI portions, and YQ portions of the input signal. In some implementations, coherent receiver 510 may include one or more balanced pairs of photodetectors. For example, coherent receiver 510 may include a first pair of photodetectors to receive an XI portion, a second pair of photodetectors to receive an XQ portion, a third pair of photodetectors to receive a YI portion, and a fourth pair of photodetectors to receive a YQ portion. Coherent receiver 510 may provide converted input signal to ADCs 520.

Each of ADCs 520 may include one or more components that convert an analog signal into a digital signal. In some implementations, each ADC 520 may convert the voltage signals, received from coherent receiver 510, into digital signals. ADC 540 may provide the digital signals to Rx DSP 530. In some implementations, optical receiver 253 may include four ADCs 520 or some other number of ADCs 520 (e.g., one ADC 520 for each electrical signal output by coherent receiver 510). In some implementations, the digital signals may include portions associated with the input signal, such as portions provided over the XI, XQ, YI, and YQ lanes.

Rx DSP 530 may include one or more components that receive the digital signals from ADCs 520. In some implementations, Rx DSP 530 may include a digital signal processing device or a collection of digital signal processing devices. In some implementations, Rx DSP 530 may receive the digital signals from ADCs 520 and may process the digital signals (e.g., to track phase noise, compensate for chromatic dispersion and timing skews, etc., introduced during transmission of the input signal corresponding to the digital signals) to form output bits (also referred to as "soft metrics") including client data associated with the input signal. Rx DSP 530 may provide the output bits (e.g., which may include portions provided over the XI, XQ, YI, and YQ lanes) to pilot phase estimate component 540.

Pilot phase estimate component 540 may include one or more components that receive the output bits from Rx DSP 530, and further process the output bits. In some implementations, pilot phase estimate component 540 may use the pilot symbols (e.g., inserted by pilot symbol insertion component 325 (FIG. 3)) to identify cycle slips associated with the input signal. In some implementations, pilot phase estimate component 540 may correct the identified cycle slips, and may erase soft metrics of symbols (e.g., by zeroing a reliability value) associated with transition times of the identified cycle slips. In some implementations, pilot phase estimate component 540 may provide a signal with a minimal phase error (e.g., due to correction of the cycle slips) to decoder 550. Further details of pilot phase estimate component 540 are provided below in connection with, for example, FIGS. 6-12F.

Decoder 550 may include one or more components that receive the signal with the minimal phase error from pilot phase estimate component 540. In some implementations, decoder 550 may receive an erase signal associated with the transition times of the cycle slips, and may apply the erase signal to zero the reliability value of symbols associated with the transition times during cycle slips. In some implementations, decoder 550 may estimate transmitted bits of the input signal based on the symbols provided in the signal with the minimal phase error, and may provide the estimates and the signal with the minimal phase error to frame header stripper 560.

Frame header stripper 560 may include one or more components that receive the signal from decoder 550 and remove the frame header provided by frame header insertion component 315 (FIG. 3). In some implementations, frame header stripper 560 may provide the estimates of the transmitted bits and the signal with the minimal phase error to de-interleaver 570.

De-interleaver 570 may include one or more components that receive the estimates and the signal with the minimal phase error from frame header stripper 560. In some implementations, de-interleaver 570 may receive the signal as output bits in groups of fours. In some implementations, de-interleaver 570 may arrange the bits into four (FEC) frames such that first bits, of multiple groups of bits, are provided in a first frame; second bits, of the multiple groups of bits, are provided in a second frame; third bits, of the multiple groups of bits, are provided in a third frame; and fourth bits, of the multiple groups of bits, are provided in a fourth frame. In some implementations, de-interleaver 570 may group the first bits, second bits, third bits, and fourth bits from different groups to prevent bits with errors from being grouped together. In some implementations, de-interleaver 570 may provide the grouped bits to FEC decoder 580.

FEC decoder 580 may include one or more components that receive the grouped bits from de-interleaver 570 and decode the grouped bits. In some implementations, FEC decoder 580 may include a digital decoding device, or a collection of digital decoding devices. In some implementations, FEC decoder 580 may receive grouped bits from de-interleaver 570, and may decode the grouped bits using a block code, a convolution code, a product turbo code, a low density parity check (LDPC) code, and/or some other code or technique. In some implementations, FEC decoder 580 may decode the grouped bits to form recovered client data corresponding to client data provided to optical transmitter 212, as described above.

The number of components shown in FIG. 5 is provided as an example. In practice, optical receiver 253 may include additional components, fewer components, different components, or differently arranged components than those shown in FIG. 5. Additionally, or alternatively, one or more components of optical receiver 253 may perform one or more functions described as being performed by another one or more components of optical receiver 253.

Figure 6:
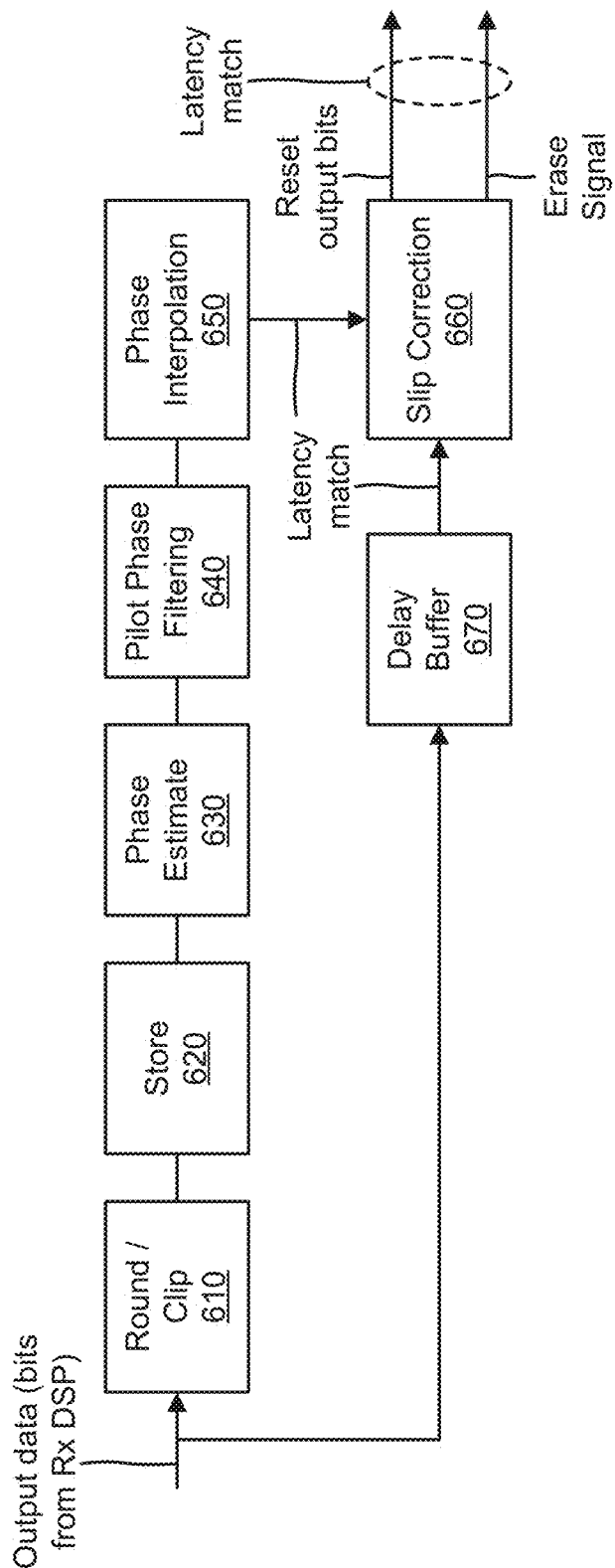
FIG. 6 is a diagram of example components of a pilot phase estimate component depicted in FIG. 5.

FIG. 6 is a diagram of example components of pilot phase estimate component 540 (FIG. 5). As shown, pilot phase estimate component 540 may include a round/clip component 610, a store component 620, a phase estimate component 630, a pilot phase filtering component 640, a phase interpolation component 650, a slip correction component 660, and a delay buffer 670.

Round/clip component 610 may include one or more components that receive output data (e.g., the output bits from Rx DSP 530 (FIG. 5)), and further process the output data. In some implementations, round/clip component 610 may reduce a bit resolution of the output bits by a particular number of least significant bits (LSBs). In some implementations, round/clip component 610 may clip the output bits to a particular bit resolution (e.g., 6 bit, 7 bit, etc. resolution). Round/clip component 610 may provide the further processed output bits to store component 620.

Store component 620 may include one or more components that receive the further processed output bits, and store the output bits until requested by phase estimate component 630. In some implementations, store component 620 may provide the output bits to phase estimate component 630 when requested.

Phase estimate component 630 may include one or more components that receive the output bits from store component 620, and estimate a residual phase error, after carrier recovery, using the pilot symbols included in the output bits. In some implementations, phase estimate component 630 may estimate phase values for four subcarrier signals based on the pilot symbols inserted by pilot symbol insertion component 325 (FIG. 3). In some implementations, phase estimate component 630 may provide the estimated phase values to pilot phase filtering component 640.

Pilot phase filtering component 640 may include one or more components that receive the estimated phase values from phase estimate component 630, and filter the estimated phase values. In some implementations, pilot phase filtering component 640 may average or low pass filter the estimated phase values to reject noise in the estimated phase values. Pilot phase filtering component 640 may provide the filtered estimated phase values to phase interpolation component 650.

Phase interpolation component 650 may include one or more components that receive the filtered estimated phase values from pilot phase filtering component 640, and interpolate the filtered estimate phase values. In some implementations, since the estimated phase values may only be available for symbol index 0, 8, 16, 24, etc., phase interpolation component 650 may interpolate (e.g., using a linear function) the estimated phase values to obtain the phase values between symbol index 0 and 8, between symbol index 8 and 16, etc. Phase interpolation component 650 may provide the estimated phase values and the interpolated phase values to slip correction component 660.

Slip correction component 660 may include one or more components that receive the estimated and interpolated phase values from phase interpolation component 650, and reset the output bits based on the estimated and interpolated phase values. In some implementations, slip correction component 660 may identify a cycle slip based on the estimated and interpolated phase values, and may determine a direction and a center of the cycle slip. In some implementations, slip correction component 660 may generate a rotation value based on the direction and the center of the cycle slip, and may apply the rotation value to eliminate or minimize a phase error associated with the cycle slip, except for the phase error associated with the transition time. In some implementations, slip correction component 660 may generate, based on the transition time and the center of the cycle slip, an erase signal to zero the reliability value of symbols associated with the transition time, and may provide the erase signal to decoder 550. Decoder 550 may utilize the erase signal to reduce the effect of sign flips associated with the transition time and improve performance of FEC decoder 580.

Delay buffer 670 may include one or more components that receive the output data, and delay the providing of the output data to slip correction component 660. In some implementations, the delay of the output data may ensure a latency match between receipt of the output data and receipt of the estimated and interpolated phase values by slip correction component 660. As further shown in FIG. 6, a latency match may exist between the reset output bits and the erase signal generated by slip correction component 660.

The number of components shown in FIG. 6 is provided as an example. In practice, pilot phase estimate component 540 may include additional components, fewer components, different components, or differently arranged components than those shown in FIG. 6. Additionally, or alternatively, one or more components of pilot phase estimate component 540 may perform one or more functions described as being performed by another one or more components of pilot phase estimate component 540.

Figure 7A:
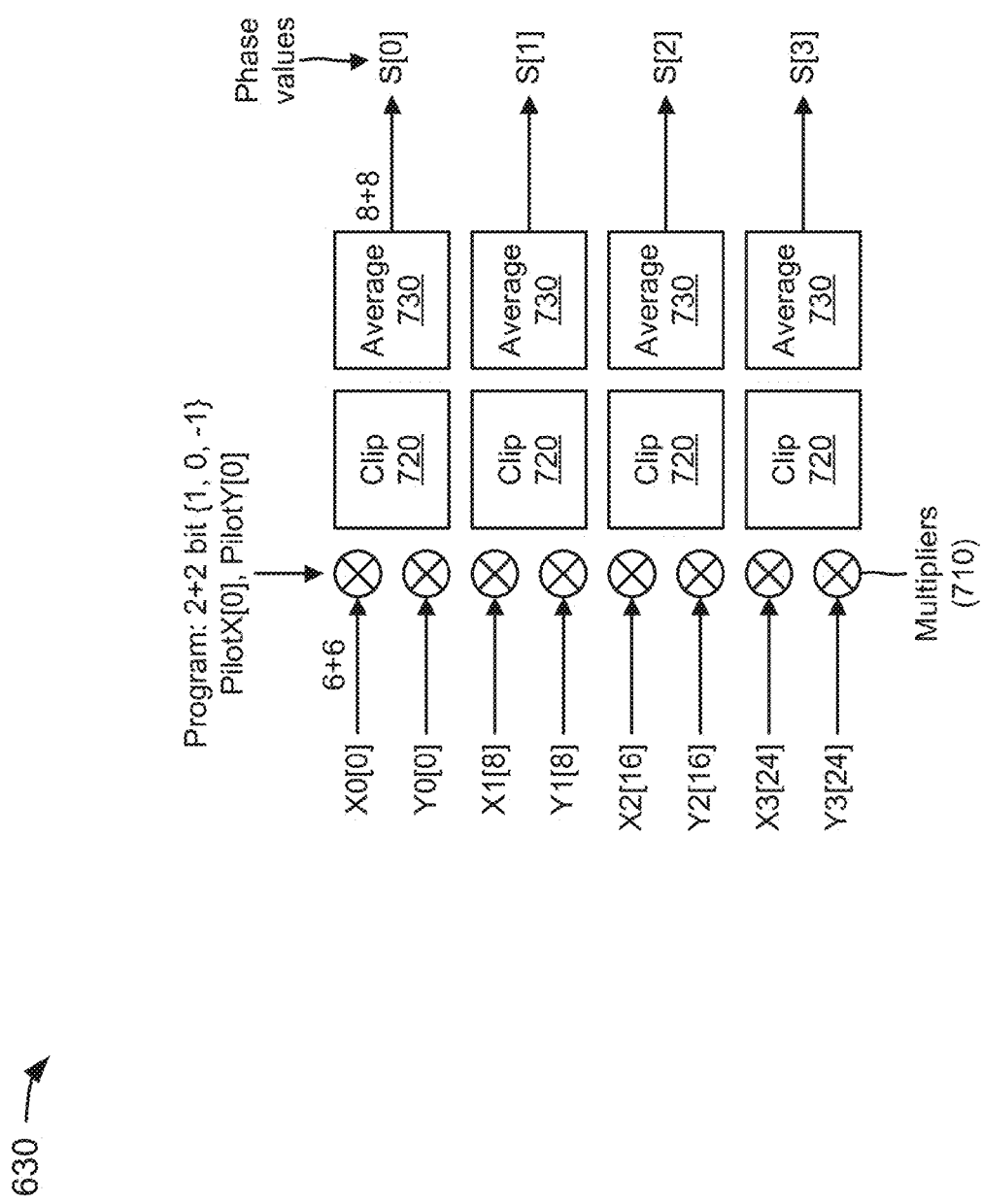
FIGS. 7A-7C are diagrams of example components of a phase estimate component depicted in FIG. 6.
Figure 7B:
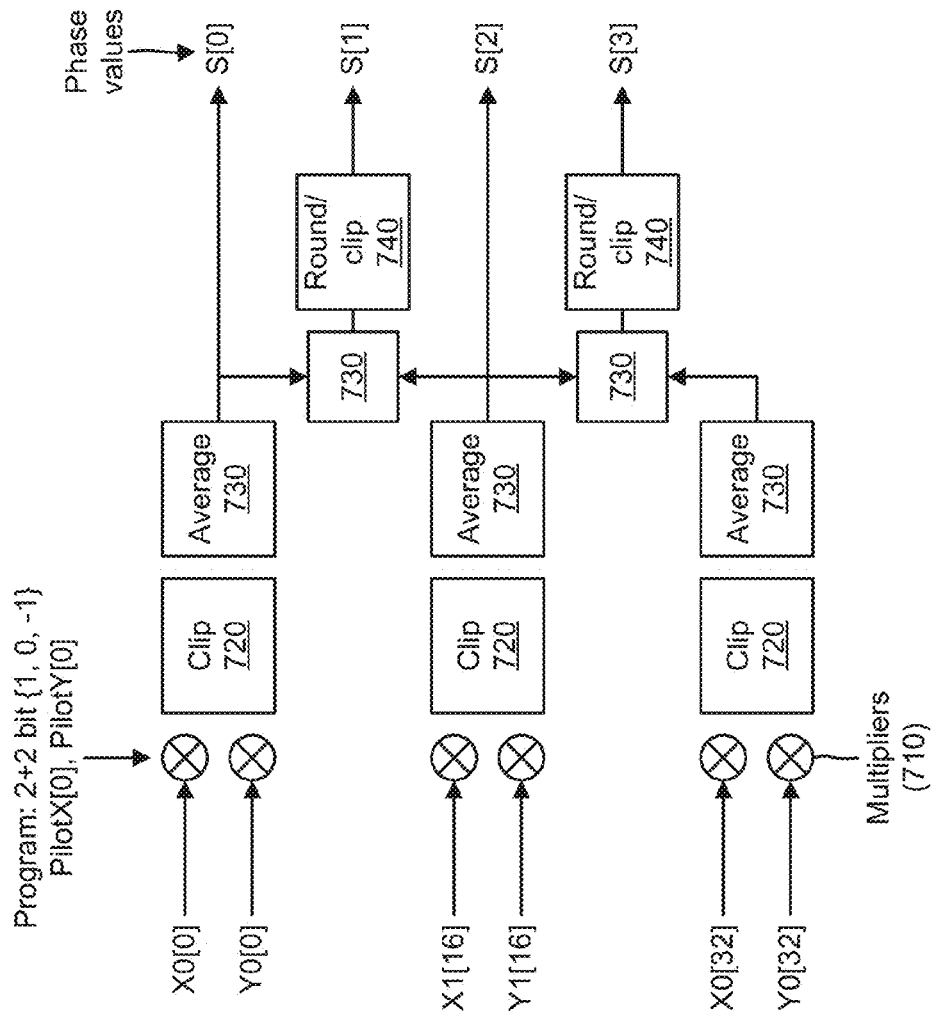
Figure 7C:
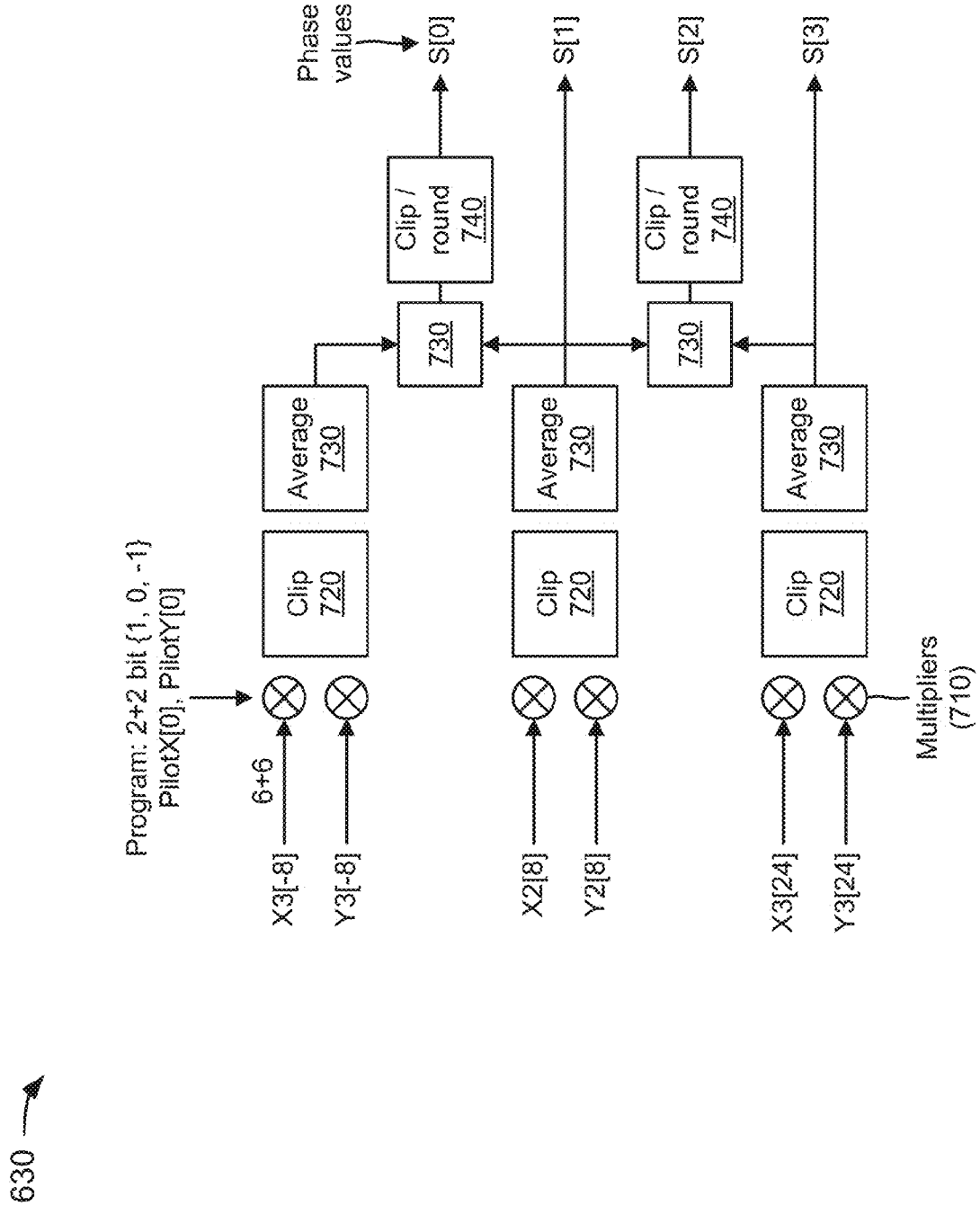

FIGS. 7A-7C are diagrams of example components of phase estimate component 630 (FIG. 6). FIG. 7A may include components of phase estimate component 630 for estimating phase values of four subcarrier signals based on the pilot symbols, and FIGS. 7B and 7C may include components of phase estimate component 630 for estimating phase values of two subcarrier signals based on the pilot symbols. In some implementations, phase estimate component 630 may estimate phase values of three subcarrier signals and/or of independent subcarrier signals.

As shown in FIG. 7A, phase estimate component 630 may include multipliers 710, clip components 720, and average components 730. Each multiplier 710 may include one or more components that receive, process, and/or combine two or more signals. In some implementations, each multiplier 710 may receive two or more signals and may combine the two or more signals into a combined signal that is outputted. Each clip component 720 may include one or more components that clip output bits (e.g., received from multipliers 710) to a particular bit resolution (e.g., 6 bit, 7 bit, etc. resolution).

Each average component 730 may include one or components that average output bits received from clip components 720.

As shown in FIG. 7A, XI, XQ, YI, and YQ portions (e.g., at symbol index 0) from the first subcarrier signal may be used to calculate a first phase value (e.g., S[0]) at a time equal to zero. In some implementations, pilot framing may be utilized to identify a pilot position, and may provide correct Tx pilot symbols (e.g., PilotX[0] and PilotY[0]) to X0[0] and Y0[0]. Pilot framing may include X0[0]*conj(PilotX[0]) and Y0[0]*conj(PilotY[0]), where conj refers to conjugation of a complex number. XI, XQ, YI, and YQ portions (e.g., at symbol index 8) from the second subcarrier signal may be used to calculate a second phase value (e.g., S[1]) at a time equal to eight. XI, XQ, YI, and YQ portions (e.g., at symbol index 16) from the third subcarrier signal may be used to calculate a third phase value (e.g., S[2]) at a time equal to sixteen. XI, XQ, YI, and YQ portions (e.g., at symbol index 24) from the fourth subcarrier signal may be used to calculate a fourth phase value (e.g., S[3]) at time equal to twenty-four.

As shown in FIGS. 7B and 7C, phase estimate component 630 may also include round/clip components 740. Each round/clip component 740 may include one or more components that reduce a bit resolution of bits by a particular number of LSBs, and clip the bits to a particular bit resolution (e.g., 6 bit, 7 bit, etc. resolution). As shown in FIG. 7B, XI, XQ, YI, and YQ portions (e.g., at symbol index 0) from the first subcarrier signal may be used to calculate the first phase value (e.g., S[0]) at a time equal to zero. XI, XQ, YI, and YQ portions (e.g., at symbol index 16) from the second subcarrier signal may be used to calculate the third phase value (e.g., S[2]) at a time equal to sixteen. The XI, XQ, YI, and YQ portions from the first and second subcarriers may not include samples at time eight or twenty-four. However, the second phase value (e.g., S[1]) and the fourth phase value (e.g., S[3]) may be interpolated by using the XI, XQ, YI, and YQ portions at symbol index 0, 16, and 32.

As shown in FIG. 7C, XI, XQ, YI, and YQ portions (e.g., at symbol index 8) from the third subcarrier signal may be used to calculate the second phase value (e.g., S[1]) at a time equal to eight. XI, XQ, YI, and YQ portions (e.g., at symbol index 24) from the fourth subcarrier signal may be used to calculate the fourth phase value (e.g., S[3]) at a time equal to twenty-four. The XI, XQ, YI, and YQ portions from the third and fourth subcarriers may not include samples at time zero or sixteen. However, the first phase value (e.g., S[0]) and the third phase value (e.g., S[2]) may be interpolated by using the XI, XQ, YI, and YQ portions at symbol index −8, 8, and 24.

The number of components shown in FIGS. 7A-7C is provided as an example. In practice, phase estimate component 630 may include additional components, fewer components, different components, or differently arranged components than those shown in FIGS. 7A-7C. Additionally, or alternatively, one or more components of phase estimate component 630 may perform one or more functions described as being performed by another one or more components of phase estimate component 630.

Figure 8:
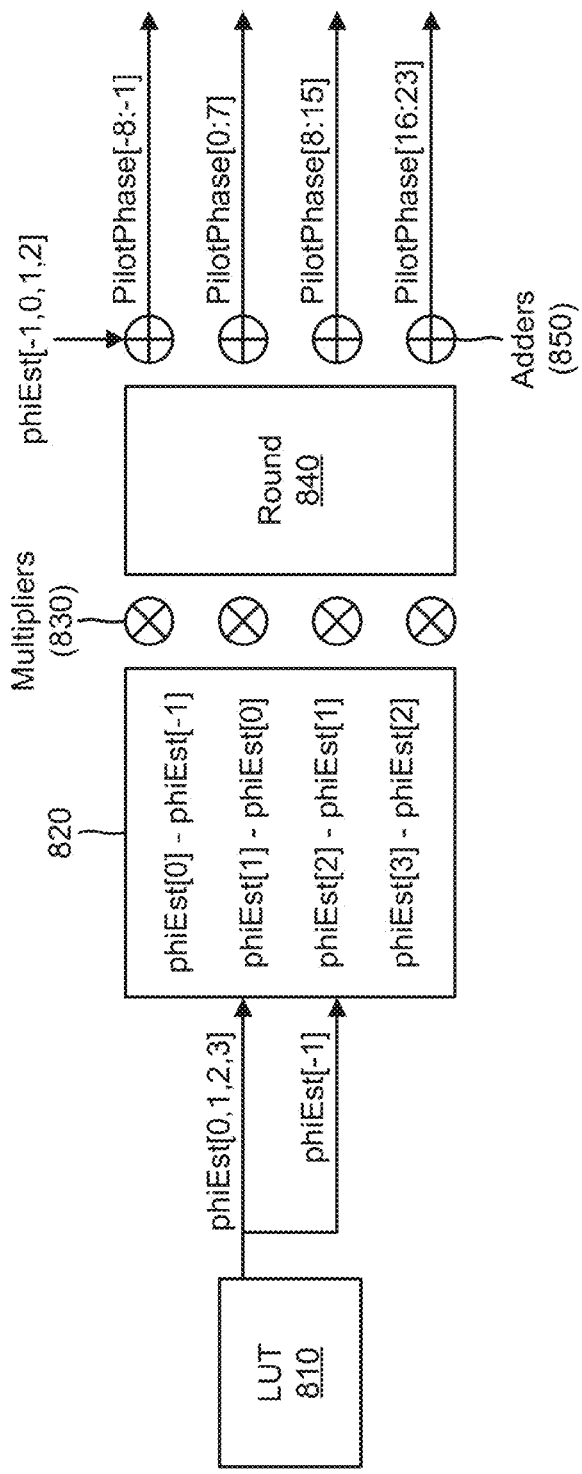
FIG. 8 is a diagram of example components of a phase interpolation component depicted in FIG. 6.

FIG. 8 is a diagram of example components of phase interpolation component 650 (FIG. 6). As shown, phase interpolation component 650 may include a lookup table (LUT) 810, a linear interpolator 820, multipliers 830, a round component 840, and adders 850.

LUT 810 may include one or more components that receive the filtered phase values (e.g., S[0], S[1], S[2], and S[3]). LUT 810 may convert a complex value to a phase value from zero (0) to three-hundred and sixty (360) degrees, represented as an eight bit integer. In some implementations, LUT 810 may receive complex values, and may convert the complex values into real values, such as "phiEst" as shown in FIG. 8. phiEst may include a name of a real value that is output by LUT 810, and may be an actual phase estimate from the pilot symbols. For example, phiEst[0] may correspond to a first phase estimate (e.g., first phase value S[0]) of a current clock cycle, phiEst[1] may correspond to a second phase estimate (e.g., second phase value S[1]) of the current clock cycle, phiEst[2] may correspond to a third phase estimate (e.g., third phase value S[2]) of the current clock cycle, phiEst[3] may correspond to a fourth phase estimate (e.g., fourth phase value S[3]) of the current clock cycle, and phiEst[−1] may correspond to a fourth phase estimate of a previous clock cycle.

Linear interpolator 820 may include one or more components that receive the phase estimates from LUT 810, and perform a linear interpolation with the phase estimates. In some implementations, linear interpolator 820 may interpolate between the phase estimates. For example, for each clock cycle, linear interpolator 820 may interpolate between the first phase estimate (phiEst[0]) and the fourth phase estimate (phiEst[−1]) of the previous clock cycle, between the second phase estimate (phiEst[1]) and the first phase estimate (phiEst[0]), between the third phase estimate (phiEst[2]) and the second phase estimate (phiEst[1]), and between the fourth phase estimate (phiEst[3]) and the third phase estimate (phiEst[2]).

Each multiplier 830 may include one or more components that receive, process, and/or combine two or more signals. In some implementations, each multiplier 830 may receive two or more signals (e.g., linear interpolations) from linear interpolator 820, and may combine the two or more signals into a combined signal that is outputted to round component 840. In some implementations, each multiplier 830 may include one input sample and eight output samples. The eight output samples may be obtained by multiplying the input sample by [0, 1, 2, 3, 4, 5, 6, 7], and may be provided to round component 840.

Round component 840 may include one or more components that receive the combined linear interpolations from multipliers 830, and further process the combined linear interpolations. In some implementations, round component 840 may reduce a bit resolution of the combined linear interpolations by a particular number of least significant bits (LSBs).

Each adder 850 may include one or more components that receive the processed linear interpolations from round component 840 and receive the first, second, and third phase estimates from a current clock cycle and a fourth phase estimate from a previous clock cycle. In some implementations, each adder 850 may add the received information to generate phase estimates between the times −8 to −1, 0 to 7, 8 to 15, and 16 to 23. For example, PilotPhase[−8:−1] may correspond to the phase estimate between the times −8 to −1; PilotPhase[0:7] may correspond to the phase estimate between the times 0 to 7; PilotPhase[8:15] may correspond to the phase estimate between the times 8 to 15; and PilotPhase[16:23] may correspond to the phase estimate between the times 16 to 23. In some implementations, each adder 850 may individually increment the eight output samples of multiplier 830 by an initial value. For example, the PilotPhase[−8:−1] may be determined by adding phiEst[−1] to each of the eight output samples, PilotPhase[0:7] may be determined by adding phiEst[0] to each of the eight output samples, etc.

In some implementations, linear interpolator 820, multipliers 830, round component 840, and adder 850 may perform linear interpolation. For example, for PilotPhase[0:7], components 820-850 may perform the following calculations:

$$PilotPhase[0] = phiEst[0] + 0 * (phiEst[1] - phiEst[0])/8;$$
$$PilotPhase[1] = phiEst[0] + 1 * (phiEst[1] - phiEst[0])/8;$$
$$PilotPhase[2] = phiEst[0] + 2 * (phiEst[1] - phiEst[0])/8;$$
$$\ldots$$
$$PilotPhase[7] = phiEst[0] + 7 * (phiEst[1] - phiEst[0])/8.$$

The number of components shown in FIG. 8 is provided as an example. In practice, phase interpolation component 650 may include additional components, fewer components, different components, or differently arranged components than those shown in FIG. 8. Additionally, or alternatively, one or more components of phase interpolation component 650 may perform one or more functions described as being performed by another one or more components of phase interpolation component 650.

Figure 9:
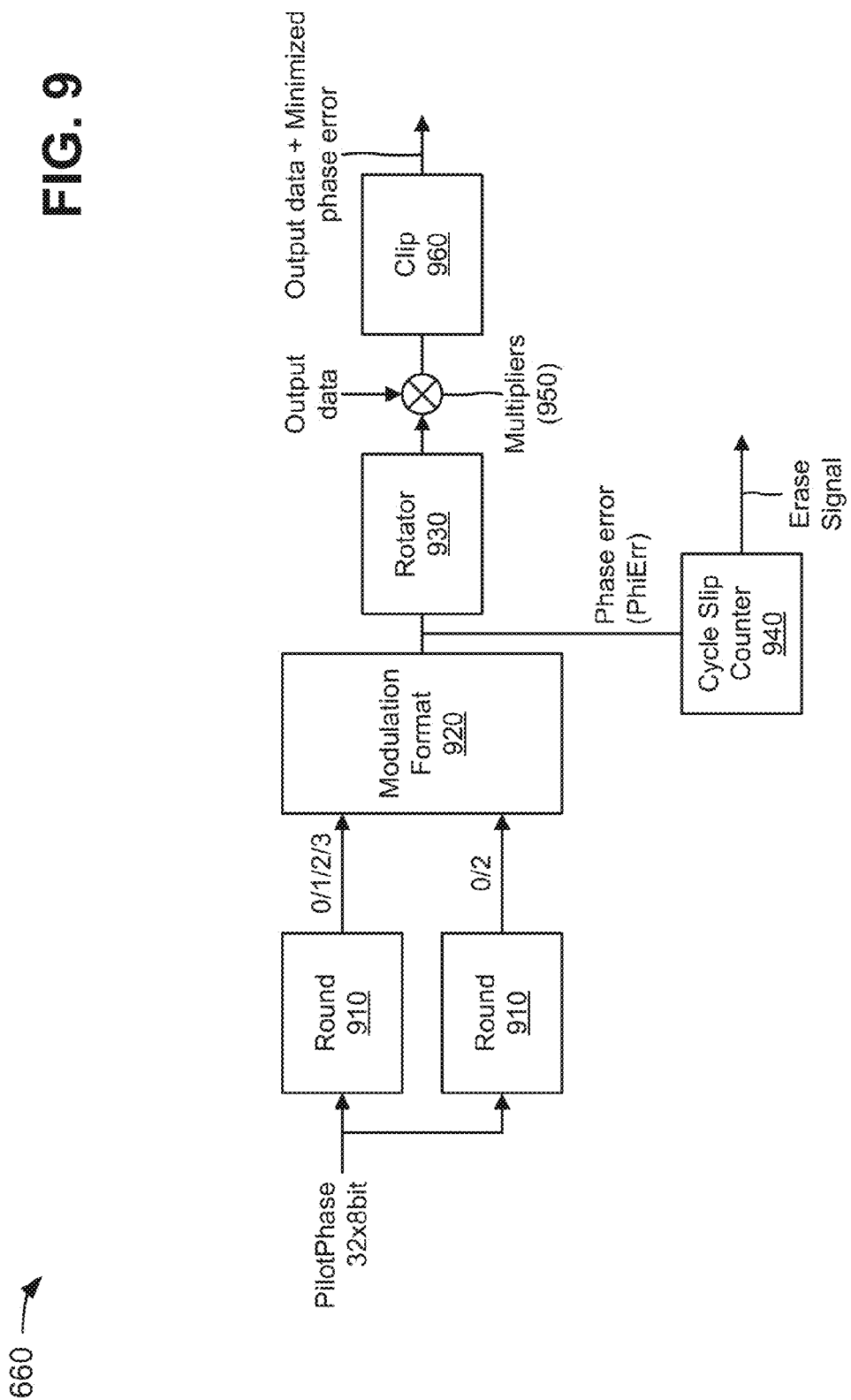
FIG. 9 is a diagram of example components of a slip correction component depicted in FIG. 6.

FIG. 9 is a diagram of example components of slip correction component 660 (FIG. 6). As shown, slip correction component 660 may include round components 910, a modulation format component 920, a rotator 930, a cycle slip counter 940, multipliers 950, and a clip component 960.

Each round component 910 may include one or more components that receive the phase estimates (PilotPhase) from phase interpolation component 650, and further process the phase estimates. In some implementations, each round component 910 may reduce a bit resolution of the phase estimates by a particular number of least significant bits (LSBs). A first round component 910 may provide the first through fourth phase estimates to modulation format component 920, and a second round component 910 may provide the first and third phase estimates to modulation format component 920.

Modulation format component 920 may include one or more components that receive the phase estimates from round components 910, and compare the phase estimates to the modulation format of the input signal (FIG. 5) to determine a phase error (PhiErr) associated with the input signal. In some implementations, modulation format component 920 may identify a cycle slip based on the comparison of the phase estimates and the modulation format. Modulation format component 920 may provide information associated with the phase error and the cycle slip to rotator 930 and cycle slip counter 940. The information may include identification of a center of the cycle slip, and identification of a direction (e.g., 0, −90, 180, or 90 degrees) of the cycle slip.

Rotator 930 may include one or more components that receive the information associated with the phase error and the cycle slip, and determine a rotation value based on the direction and the center of the cycle slip. In some implementations, rotator 930 may determine a rotation value that provides a change in the phase rotation of 90 degrees in the opposite direction of the direction of the cycle slip. In some implementations, the rotation value may be provided as a complex value (e.g., 1, −j, −1, and j) which represent phase rotations (e.g., 0, −90, 180, and 90 degrees). In some implementations, rotator 930 may apply the rotation value to eliminate or minimize the phase error except for the phase error associated with the transition time of the cycle slip. Rotator 930 may provide the minimized phase error to multipliers 950.

In some implementations, modulation format component 920 and rotator 930 may make a decision on the phase estimates (e.g., the input phase value) to determine whether a cycle slip occurred and in which direction. For example, if the phase is greater than 45 degrees and less than 135 degrees, components 920/930 may determine that a +90 degree cycle slip has occurred and may output −j for multiplier 950. If the phase is less than −45 degrees and greater than −135 degrees, components 920/930 may determine that a −90 degree cycle slip has occurred and may output +j for multiplier 950. If the phase is greater than 135 degrees and less than −135 degrees, components 920/930 may determine that the data is inverted and may output −1 for multiplier 950. If the phase is less than 45 degrees and greater than −45 degrees (i.e., no cycle slip), and components 920/930 may output +1 for multiplier 950. In this example, components 920/930 may make a phase decision into four quadrants for the QPSK format. For the BPSK format, if the phase is greater than 90 degrees and less than −90 degrees, components 920/930 may determine that a 180 degree cycle slip occurred, and may output −1 for multiplier 950. Otherwise, components 920/930 may determine that no cycle slip has occurred and may output +1 for multiplier 950.

Cycle slip counter 940 may include one or more components that receive the information associated with the phase error and the cycle slip, and increment a slip counter based on the cycle slip. The slip counter may provide a measure of a cycle slip rate. In some implementations, cycle slip counter 940 may generate an erase signal based on the transition time and the center of the cycle slip. In some implementations, the erase signal may be centered on the center of the cycle slip, and may be utilized to eliminate or minimize the phase error associated with the transition time of the cycle slip. For example, decoder 550 (FIG. 5) may utilize the erase signal to minimize or reduce a reliability value associated the data in the cycle slip transition region.

Each multiplier 950 may include one or more components that receive, process, and/or combine two or more signals. In some implementations, each multiplier 950 may receive two or more signals (e.g., the minimized phase error and the output data), and may combine the two or more signals into a combined signal that is outputted to clip component 960.

Clip component 960 may include one or more components that clip bits to a particular bit resolution (e.g., 6 bit, 7 bit, etc. resolution). In some implementations, clip component 960 may receive the output data and the minimized phase error from multipliers 950, and may clip the received information to a particular bit resolution. Clip component 960 may provide the clipped output data and the minimized phase error to decoder 550 (FIG. 5).

The number of components shown in FIG. 9 is provided as an example. In practice, slip correction component 660 may include additional components, fewer components, different components, or differently arranged components than those shown in FIG. 9. Additionally, or alternatively, one or more components of slip correction component 660 may perform one or more functions described as being performed by another one or more components of slip correction component 660.

Figure 10:
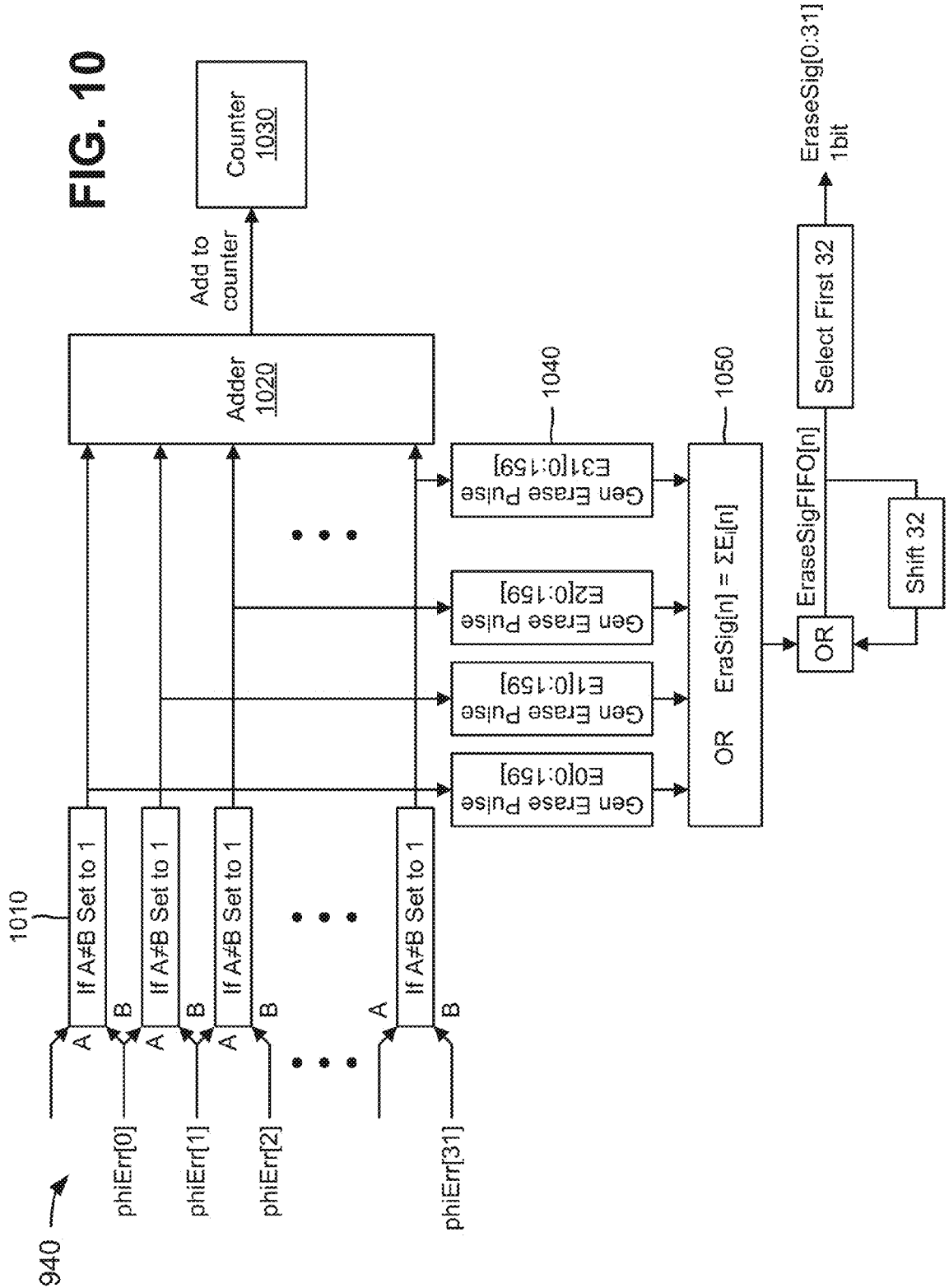
FIG. 10 is a diagram of example components of a cycle slip counter depicted in FIG. 9.

FIG. 10 is a diagram of example components of cycle slip counter 940 (FIG. 9). As shown, cycle slip counter 940 may include decision components 1010, an adder component 1020, a counter 1030, erase pulse components 1040, and an erase signal component 1050.

Decision component 1010 may include one or more components that receive phase errors (phiErr[0, 1, . . . , 31]) at different times of the clock cycle. In some implementations, the phase errors may provide an indication of which of the four quadrants (e.g., 0, −90, 180, and 90 degrees) is used for phase rotation (e.g., for generating the rotation value). In some implementations, decision component 1010 may compare adjacent phase errors (e.g., A and B or phiErr[0] and phiErr[1]), and may determine whether there is a difference between the adjacent phase errors. If decision component 1010 determines that there is a difference between the adjacent phase errors (e.g., A≠B), decision component 1010 may detect a cycle slip and may set a value to one. If decision component 1010 determines that there is not a difference between the adjacent phase errors (e.g., A=B), decision component 1010 may not detect a cycle slip and may set the value to zero. In some implementations, decision components 1010 may detect a number of cycle slips that occur during a clock cycle (e.g., every millisecond, second, etc.). In some implementations, decision components 1010 may provide the determined values to corresponding erase pulse components 1040 so that erase pulse components 1040 may generate erase pulses that correspond with the detected cycle slips. In some implementations, decision components 1010 may provide the determined values to adder component 1020.

Adder component 1020 may include one or more components that receive the values from decision components 1010, and add the values together to generate a total number of cycle slips in a clock cycle. In some implementations, adder component 1020 may provide the total number of cycle slips to counter 1030.

Counter 1030 may include one or more components that receive the total number of cycle slips, per clock cycle, from adder component 1020, and store the total number of cycle slips. In some implementations, counter 1030 may utilize the total number cycle slips to calculate a cycle slip rate for a particular clock cycle.

Erase pulse component 1040 may include one or more components that receive the value from a corresponding decision component 1010, and determine whether to generate an erase pulse based on the received value. In some implementations, if the value equals one, erase pulse component 1040 may generate an erase pulse for the phase error corresponding to the value. In some implementations, if the value equals zero, erase pulse component 1040 may not generate an erase pulse for the phase error corresponding to the value. The erase pulse may include information that sets a reliability value of the corresponding data sample to zero (e.g., so that the corresponding phase error is not considered by FEC decoder 580 (FIG. 5)). In some implementations, erase pulse components 1040 may provide the generated erase pulses to erase signal component 1050.

Erase signal component 1050 may include one or more components that receive the generated erase pulses from erase pulse components 1040. In some implementations, if consecutive erase pulse components 1040 generate an erase pulse, erase signal component 1050 may combine the erase pulses together to produce a longer erase pulse or signal. In some implementations, the erase pulse may be as short as 4 symbols and/or as long as 128 symbols. In some implementations, since the erase pulse may be longer than 32 symbols, erase signal component 1050 may combine a previously accumulated erase pulse (e.g., generated in a previous clock cycle) with an erase pulse generated in a current clock cycle.

In some implementations, erase signal component 1050 may include a data structure (e.g., a table, a database, etc.) that includes a list of programmable erase modes which range from 0 to 10, where each setting may provide a different width of the erase pulse. In some implementations, the list of programmable erase modes may include the following information:

| | Definition for E0[0:159]<br>Programmable 'eraseMode': |
|---|---|
| 0 | [zeros(62, 1); ones(4, 1); zeros(94, 1)] |
| 1 | [zeros(61, 1); ones(6, 1); zeros(93, 1)] |
| 2 | [zeros(60, 1); ones(8, 1); zeros(92, 1)] |
| 3 | [zeros(58, 1); ones(12, 1); zeros(90, 1)] |
| 4 | [zeros(56, 1); ones(16, 1); zeros(88, 1)] |
| 5 | [zeros(52, 1); ones(24, 1); zeros(84, 1)] |
| 6 | [zeros(48, 1); ones(32, 1); zeros(80, 1)] |
| 7 | [zeros(40, 1); ones(48, 1); zeros(72, 1)] |
| 8 | [zeros(32, 1); ones(64, 1); zeros(64, 1)] |
| 9 | [zeros(16, 1); ones(96, 1); zeros(48, 1)] |
| 10 | [zeros(0, 1); ones(128, 1); zeros(32, 1)] |

E1[0:159] is E0[n] shifted to the right by 1
E2[0:159] is E0[n] shifted to the right by 2
* * *
E31[0:159] is E0[n] shifted to the right by 31, where E# refers to an erase pulse (E) at a time (#) of the clock cycle.

The number of components shown in FIG. 10 is provided as an example. In practice, cycle slip counter 940 may include additional components, fewer components, different components, or differently arranged components than those shown in FIG. 10. Additionally, or alternatively, one or more components of cycle slip counter 940 may perform one or more functions described as being performed by another one or more components of cycle slip counter 940.

FIG. 11 is a flow chart of an example process 1100 for detecting cycle slips and minimizing phase errors associated with cycle slips. In some implementations, one or more process blocks of FIG. 11 may be performed by receiver module 250 (e.g., optical receiver 253). In some implementations, one or more process blocks of FIG. 11 may be performed by another device or a group of devices separate from or including receiver module 250.

As shown in FIG. 11, process 1100 may include receiving a signal with a phase error and pilot symbols (block 1110). For example, optical transmitter 212 of transmitter module 210 may transmit an optical signal along an optical fiber to a particular optical receiver 253 of receiver module 250. In some implementations, prior to transmission of the optical signal, pilot symbol insertion component 325 of optical transmitter 212 may insert one or more pilot symbols into mapped modulation symbols of the optical signal. In some implementations, transmission of the optical signal may generate noise that creates a phase error in the optical signal. In some implementations, optical receiver 253 may receive the optical signal with the pilot symbols and the phase error, and may convert the optical signal into an electrical signal. For example, processing by coherent receiver 510, ADCs 520, and Rx DSP 530 may convert the optical signal into an electrical signal that includes the pilot symbols and the phase error. In some implementations, the electrical signal may be received by pilot phase estimate component 540 of optical receiver 253.

As further shown in FIG. 11, process 1100 may include identifying a cycle slip due to the phase error based on the pilot symbols (block 1120). For example, pilot phase estimate component 540 may include phase estimate component 630, pilot phase filtering component 640, phase interpolation component 650, and slip correction component 660. In some implementations, the electrical signal with the phase error and pilot symbols may be received by phase estimate component 630, and phase estimate component 630 may generate a phase estimate based on the pilot symbols. Pilot phase filtering component 640 may average and/or filter the phase estimate to eliminate noise in the phase estimate. Phase interpolation component 650 may interpolate the filtered phase estimate to generate phase values. Slip correction component 660 may utilize the generated phase values to identify a cycle slip due to the phase error. In some implementations, the cycle slip may be associated with a transition time.

As further shown in FIG. 11, process 1100 may include determining a direction and a center associated with the cycle slip based on the pilot symbols (block 1130). For example, slip correction component 660 may determine, based on the phase values, a center of the cycle slip and a direction of the cycle slip. In some implementations, slip correction component 660 may utilize the center and the direction of the cycle slip to eliminate or minimize the phase error in the signal.

As further shown in FIG. 11, process 1100 may include generating a rotation value based on the direction and the center of the cycle slip (block 1140). For example, slip correction component 660 may generate a rotation value based on the direction and the center of the cycle slip. In some implementations, the rotation value may include a value that provides a change in phase rotation of ninety (90) degrees in an opposite direction of the direction of the cycle slip. For example, if the direction of the cycle slip is +90 degrees, slip correction component 660 may generate a rotation value of −90 degrees.

As further shown in FIG. 11, process 1100 may include applying the rotation value to eliminate the phase error except for the phase error associated with the transition time (block 1150). For example, slip correction component 660 may apply the rotation value to eliminate or minimize the phase error in the signal, except for the phase error associated with the transition time of the cycle slip. In some implementations, a non-zero transition time may cause symbols of the phase error, both before and after application of the rotation value, to still experience a phase error.

As further shown in FIG. 11, process 1100 may include generating an erase signal based on a transition time and the center of the cycle slip (block 1160). For example, slip correction component 660 may generate an erase pulse based on a transition time and the center of the cycle slip. In some implementations, the erase pulse may include a value that zeros out reliability values associated the data samples that correspond to the transition time.

As further shown in FIG. 11, process 1100 may include applying the erase signal to minimize the effect of the phase error associated with the transition time (block 1170). For example, decoder 550 may apply the erase pulse to eliminate or minimize the phase error associated with the transition time of the cycle slip. In some implementations, the erase pulse may include a value that zeros out reliability values associated the data samples that correspond to the transition time. Zeroing the reliability of the data samples, may minimize the adverse effect of a large phase error on the data sample.

As further shown in FIG. 11, process 1100 may include outputting the signal with a minimal phase error (block 1180). For example, after application of the rotation value and the erase pulse, the signal may include a minimal phase error. In some implementations, decoder 550 may provide the signal with the minimal phase error to FEC decoder 580 for further processing. In some implementations, decode 550 may provide the slip-corrected data samples of the signal and the erase pulse to FEC decoder 580.

Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

FIGS. 12A-12F are diagrams of an example 1200 relating to example process 1100 shown in FIG. 11. In example 1200, assume that pilot symbol insertion component 325 of optical transmitter 212 inserts one or more pilot symbols into mapped modulation symbols of an optical signal, and that optical transmitter 212 transmits the optical signal with the pilot symbols to optical receiver 253. Further, assume that transmission of the optical signal to optical receiver 253 generates noise that creates a phase error in the optical signal. Optical receiver 253 may receive the optical signal with the pilot symbols and the phase error, and may convert the optical signal into an electrical signal that includes the pilot symbols and the phase error. The electrical signal may be received and processed by one or more components of pilot phase estimate component 540 of optical receiver 253.

Figure 12A:
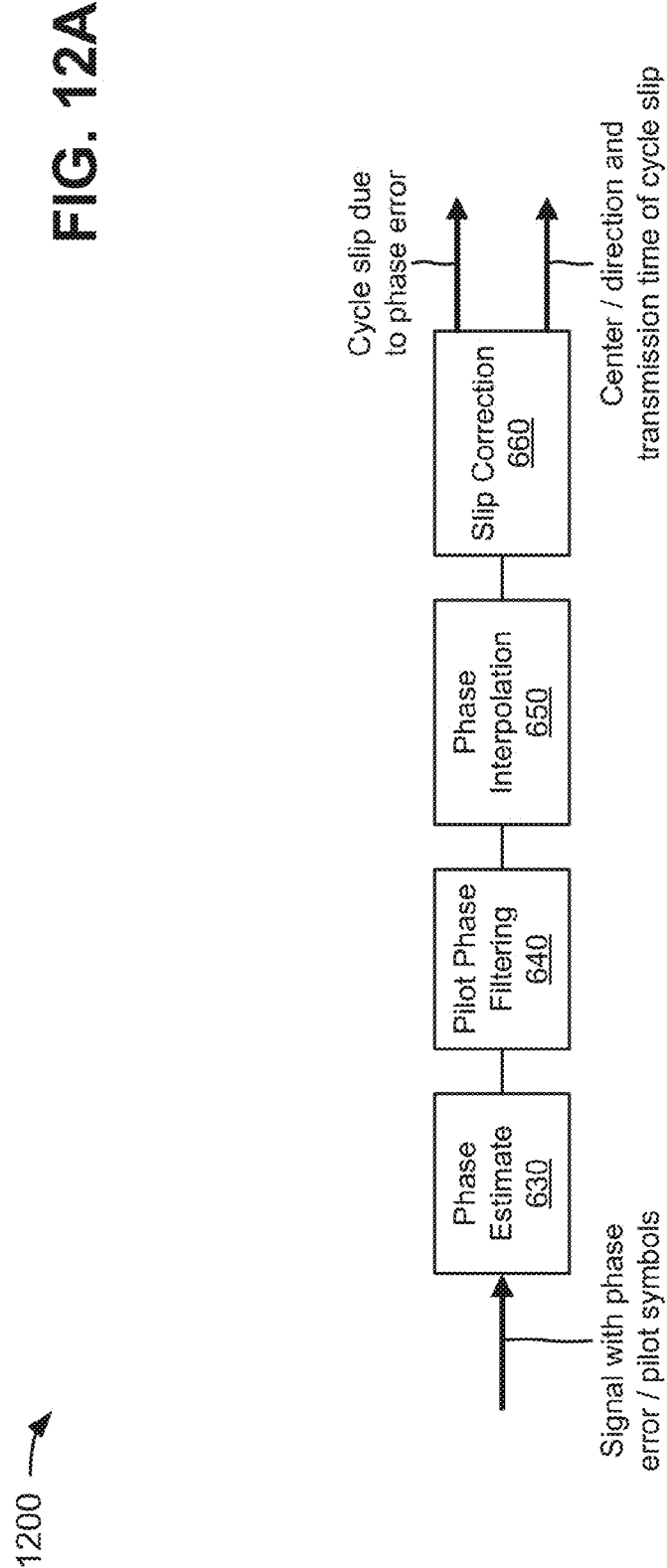

For example, as shown in FIG. 12A, the electrical signal with the phase error and the pilot symbols may be received and processed by phase estimate component 630, pilot phase filtering component 640, phase interpolation component 650, and slip correction component 660. Phase estimate component 630 may generate a phase estimate based on the pilot symbols of the signal, and may provide the phase estimate to pilot phase filtering component 640. Pilot phase filtering component 640 may average and/or filter the phase estimate to eliminate noise in the phase estimate. Pilot phase filtering component 640 may provide the filtered phase estimate to phase interpolation component 650. Phase interpolation component 650 may interpolate the filtered phase estimate to generate phase values, and may provide the phase values to slip correction component 660. Slip correction component 660 may utilize the phase values to identify a cycle slip due to the phase error of the signal, and to determine a center and a direction associated with the cycle slip.

Figure 12B:
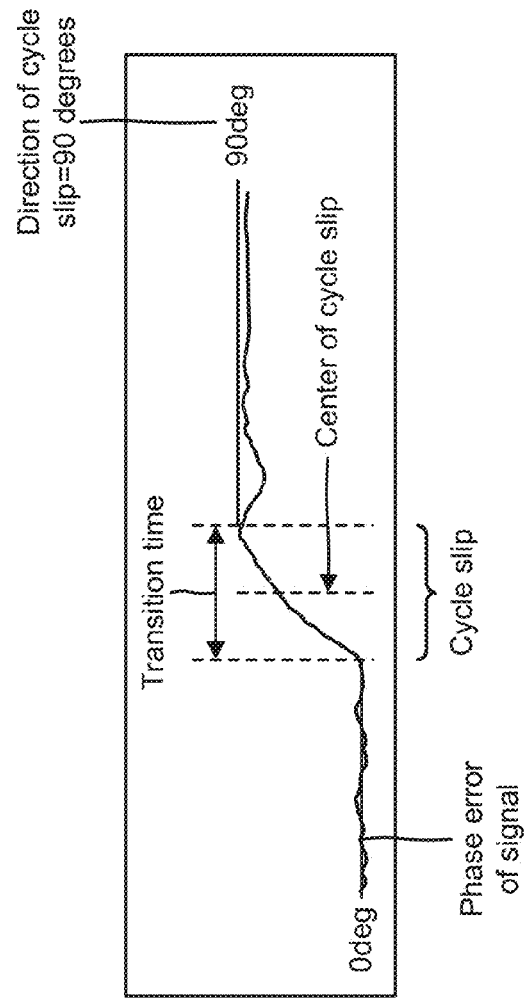

For example, as shown in FIG. 12B, slip correction component 660 may plot the phase error of the signal, and may identify the cycle slip as the portion of the phase error that transitions from 0 degrees to 90 degrees. As further shown in FIG. 12B, slip correction component 660 may identify a transition time of the cycle slip as the time it takes the phase error to transition from 0 degrees to 90 degrees. Slip correction component 660 may identify the center of the cycle slip as the midpoint of the transition time, and may identify the direction of the cycle slip as +90 degrees, as further shown in FIG. 12B.

Figure 12C:
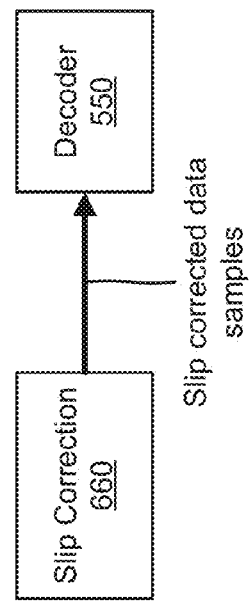
Figure 12D:
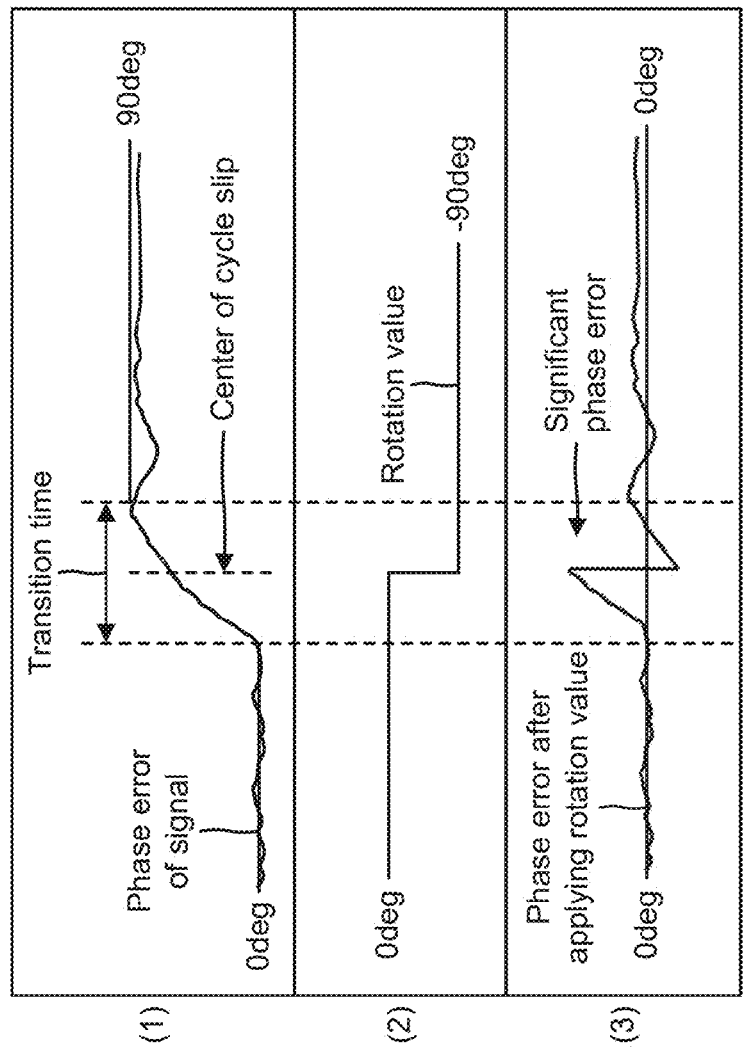
Figure 12F:
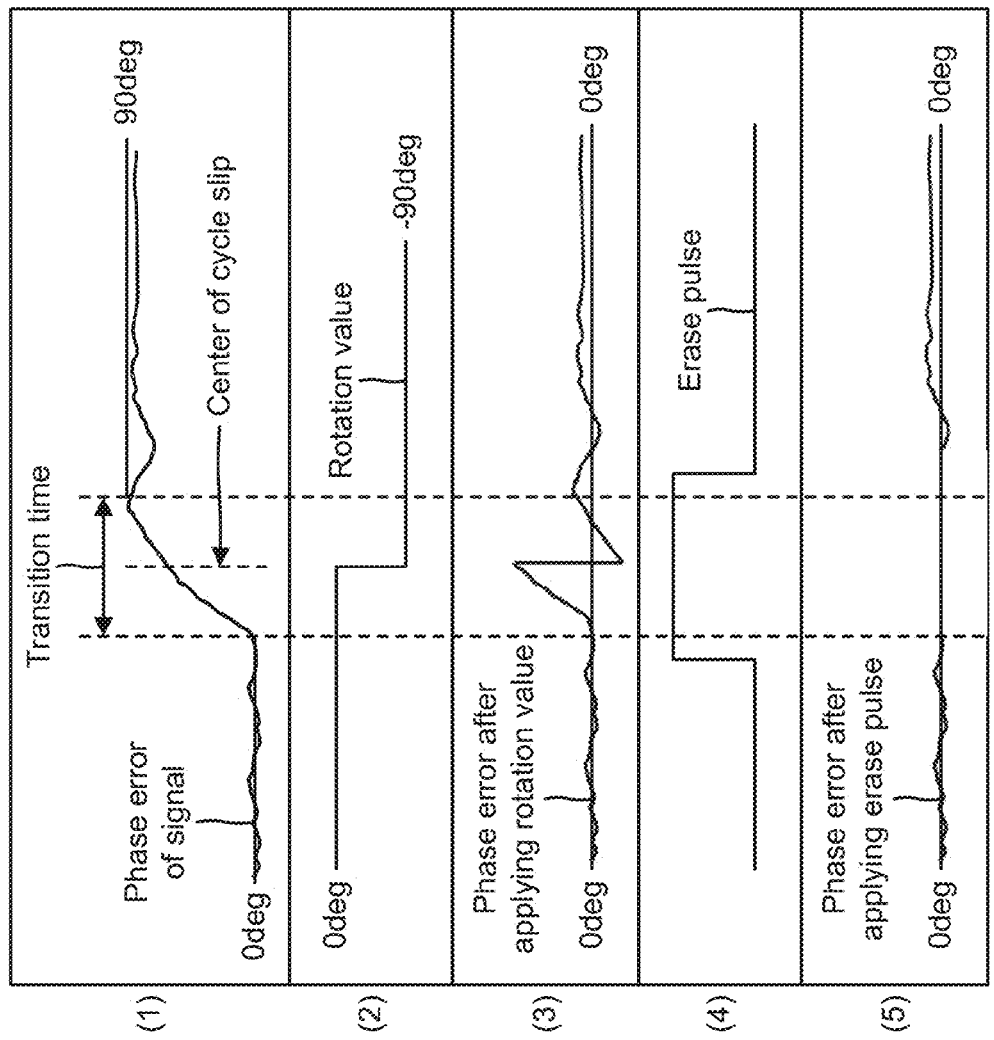

With reference to FIG. 12C, slip correction component 660 may utilize the direction and the center of the cycle slip to generate a rotation value that provides a change in phase rotation of ninety (90) degrees in an opposite direction of the direction of the cycle slip. For example, since the direction of the cycle slip is +90 degrees, slip correction component 660 may generate a rotation value of −90 degrees, as shown in the second graph of FIG. 12D. As further shown in FIG. 12D, the rotation value may be centered on the center of the cycle slip. Slip correction component 660 may apply the rotation value to eliminate or minimize the phase error in the signal, except for the phase error associated with the transition time of the cycle slip, as shown in the third graph of FIG. 12D. As further shown in FIG. 12D, the non-zero transition time may cause symbols of the phase error, both before and after application of the rotation value, to still experience a significant phase error. Slip correction component 660 may provide slip corrected data samples (e.g., after applying the rotation value) to decoder 550, as further shown in FIG. 12C.

In order to minimize the adverse effect of the large phase error associated with the data sample during the transition time, slip correction component 660 may generate an erase pulse based on the transition time and the center of the cycle slip, as shown in FIG. 12E. As shown in the fourth graph of FIG. 12F, the erase pulse may be centered on the center of the cycle slip and may encompass the transition time of the cycle slip. As further shown in FIG. 12E, slip correction component 660 may provide the erase pulse to decoder 550.

Decoder 550 may output a reliability value for each of the slip corrected data samples. For example, decoder 550 may zero the reliability values of the data samples under the control of the erase pulse. For example, the erase pulse may zero out the reliability values of the data samples associated with the transition time of the cycle slip, as shown in the fifth graph of FIG. 12F. As further shown in FIG. 12E, decoder 550 may provide the slip corrected data samples and the reliability values of the data samples to FEC decoder 580. FEC decoder 580 may decode the signal to form recovered client data based on the slip corrected data samples and the reliability values of the data samples.

As shown by example 1200, for a given cycle slip rate in optical receiver 253, the rate of sign inversions associated with the optical signal may be minimized. Minimization of the rate of sign inversions may significantly improve a performance of FEC decoder 580 in optical receiver 253.

As indicated above, FIGS. 12A-12F are provided merely as an example. Other examples are possible and may differ from what was described with regard to FIGS. 12A-12F. In some implementations, the various operations described in connection with FIGS. 12A-12F may be performed automatically or at the request of the user.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:
1. An optical system, comprising:
   an optical receiver configured to:
      receive a signal with a phase error and pilot symbols,
      identify, based on the pilot symbols, a cycle slip due to the phase error,
      the cycle slip being associated with a transition time, determine, based on the pilot symbols, a direction and a center of the cycle slip, generate a rotation value based on the direction and the center of the cycle slip, apply the rotation value to minimize the phase error in the signal except for phase error associated with the transition time of the cycle slip and to generate a modified signal, generate an erase signal based on the transition time and the center of the cycle slip, and use the erase signal to minimize an effect of the phase error associated with the transition time of the cycle slip.

2. The optical system of claim 1, where the cycle slip is due to a phase of the signal locking at a first phase and then transitioning to and re-locking at a second phase.

3. The optical system of claim 1, where, when using the erase signal, the optical receiver is further configured to:

apply the erase signal to minimize the effect of the phase error associated with the transition time of the cycle slip and to generate a further modified signal, and output the further modified signal.

4. The optical system of claim 1, where the rotation value includes a value that provides a change in a phase rotation of ninety degrees in an opposite direction of the direction of the cycle slip.

5. The optical system of claim 1, where the erase signal includes instructions to reduce a reliability value associated with data samples corresponding to the transition time.

6. The optical system of claim 1, where the optical receiver is further configured to:

generate a phase estimate based on the pilot symbols of the signal, filter the phase estimate to eliminate noise in the phase estimate, interpolate the filtered phase estimate to generate phase values, and identify the cycle slip based on the phase values.

7. The optical system of claim 1, where the signal includes one pilot symbol for every thirty-one data symbols of the signal.

8. An optical receiver, comprising:

a first component configured to:

receive an optical signal with a phase error and pilot symbols, and convert the optical signal into an electrical signal with the phase error and the pilot symbols; and a second component configured to:

receive the electrical signal from the first component, identify, based on the pilot symbols, a cycle slip due to the phase error, the cycle slip being associated with a transition time, determine, based on the pilot symbols, a direction and a center associated with the cycle slip, generate a rotation value based on the direction and the center of the cycle slip, apply the rotation value to minimize the phase error in the electrical signal except for phase error associated with the transition time of the cycle slip and to generate a modified electrical signal, generate an erase signal based on the transition time and the center of the cycle slip, and use the erase signal to minimize an effect of the phase error associated with the transition time of the cycle slip.

9. The optical receiver of claim 8, where the cycle slip is due to a phase of the optical signal locking at a first phase and then transitioning to and re-locking at a second phase.

10. The optical receiver of claim 8, further comprising:

a third component configured to:

receive the erase signal and the modified electrical signal from the pilot phase estimate component, apply the erase signal to reduce the effect of the phase error associated with the transition time of the cycle slip and to generate a further modified electrical signal, and output the further modified electrical signal.

11. The optical receiver of claim 8, where the rotation value includes a value that provides a change in a phase rotation in an opposite direction of the direction of the cycle slip.

12. The optical receiver of claim 8, where the erase signal includes instructions to reduce a reliability value associated data samples corresponding to the transition time.

13. The optical receiver of claim 8, where the second component is further configured to:

generate a phase estimate based on the pilot symbols of the electrical signal, filter the phase estimate to eliminate noise in the phase estimate, interpolate the filtered phase estimate to generate phase values, and identify the cycle slip based on the phase values.

14. The optical receiver of claim 8, where the optical signal includes:

four subcarrier signals, and one pilot symbol for every thirty-one data symbols of the optical signal.

15. An optical receiver, comprising:

a first component configured to:

receive an optical signal with a phase error and pilot symbols, and convert the optical signal into an electrical signal with the phase error and the pilot symbols;

a second component configured to:

receive the electrical signal from the first component, and generate a phase estimate based on the pilot symbols of the electrical signal;

a third component configured to:

receive the phase estimate from the second component, and filter the phase estimate to eliminate noise in the phase estimate;

a fourth component configured to:

receive the filtered phase estimate from the third component, and interpolate the filtered phase estimate to generate phase values; and a fifth component configured to:

receive the phase values from the fourth component, identify, based on the phase values, a cycle slip due to the phase error, the cycle slip being associated with a transition time, determine, based on the phase values, a direction and a center of the cycle slip, generate a rotation value based on the direction and the center of the cycle slip, apply the rotation value to minimize the phase error in the electrical signal except for phase error associated with the transition time of the cycle slip and to generate a modified electrical signal, and generate an erase signal based on the transition time and the center of the cycle slip.

16. The optical receiver of claim 15, where the cycle slip is due to a phase of the optical signal locking at a first phase and then transitioning to and re-locking at a second phase.

17. The optical receiver of claim 15, further comprising:
a sixth component configured to:
receive the erase signal and the modified electrical signal from the fifth component,
apply the erase signal to eliminate the phase error associated with the transition time of the cycle slip and to generate a further modified electrical signal, and
output the further modified electrical signal to a forward error correction (FEC) decoder of the optical receiver.

18. The optical receiver of claim 15, where the rotation value includes a value that provides a change in a phase rotation of ninety degrees in an opposite direction of the direction of the cycle slip.

19. The optical receiver of claim 15, where the erase signal includes instructions to zero a reliability value associated data samples corresponding to the transition time.

20. The optical receiver of claim 15, where the optical signal includes:
four subcarrier signals, and
one pilot symbol for every thirty-one data symbols of the optical signal.

* * * * *